US012521932B2

(12) United States Patent
Ekinaka et al.

(10) Patent No.: US 12,521,932 B2
(45) Date of Patent: Jan. 13, 2026

(54) METHOD OF PRODUCING CURVED MEMBER AND POLYCARBONATE RESIN LAMINATE WITH HARD COAT LAYER FOR HEAT BENDING

(71) Applicant: TEIJIN LIMITED, Osaka (JP)

(72) Inventors: Tatsuya Ekinaka, Osaka (JP); Takashi Yoda, Osaka (JP); Hiroshi Kishimoto, Osaka (JP); Tomoaki Akaoka, Osaka (JP)

(73) Assignee: TEIJIN LIMITED, Osaka (JP)

( * ) Notice: Subject to any disclaimer, the term of this patent is extended or adjusted under 35 U.S.C. 154(b) by 675 days.

(21) Appl. No.: 17/766,671

(22) PCT Filed: Sep. 25, 2020

(86) PCT No.: PCT/JP2020/036273
§ 371 (c)(1),
(2) Date: Jun. 30, 2023

(87) PCT Pub. No.: WO2021/070632
PCT Pub. Date: Apr. 15, 2021

(65) Prior Publication Data
US 2023/0321894 A1    Oct. 12, 2023

(30) Foreign Application Priority Data

Oct. 9, 2019   (JP) .................................. 2019-186415

(51) Int. Cl.
*B29C 53/04* (2006.01)
*B29C 53/84* (2006.01)
*B29K 69/00* (2006.01)

(52) U.S. Cl.
CPC .............. *B29C 53/04* (2013.01); *B29C 53/84* (2013.01); *B29K 2069/00* (2013.01); *B29K 2995/0088* (2013.01); *B29K 2995/0097* (2013.01)

(58) Field of Classification Search
CPC ............................... B32B 27/365; B29C 53/04
See application file for complete search history.

(56) References Cited

U.S. PATENT DOCUMENTS

| | | | |
|---|---|---|---|
| 4,045,269 A * | 8/1977 | Voss ..................... | B32B 38/1866 428/423.1 |
| 4,614,632 A | 9/1986 | Kezuka et al. | |
| 6,228,499 B1 * | 5/2001 | Nakauchi ................. | C08J 7/043 427/508 |
| 2005/0168690 A1 | 8/2005 | Kawai et al. | |
| 2006/0159888 A1 | 7/2006 | Hebrink et al. | |
| 2007/0020474 A1 | 1/2007 | Tosaki et al. | |
| 2007/0148409 A1 * | 6/2007 | Rios ........................ | B32B 27/20 428/167 |
| 2007/0182898 A1 * | 8/2007 | Yamaoka .............. | B32B 27/365 349/117 |
| 2008/0174140 A1 * | 7/2008 | McCormick ........... | B60J 1/2094 428/354 |
| 2010/0119798 A1 | 5/2010 | Kirschbaum et al. | |
| 2011/0070448 A1 * | 3/2011 | Matsumura ............... | B32B 7/12 156/199 |
| 2012/0225241 A1 | 9/2012 | Kashima et al. | |
| 2013/0329290 A1 * | 12/2013 | Inoue .................... | G02B 5/3083 359/489.07 |
| 2014/0044927 A1 * | 2/2014 | Matsumura ......... | B32B 38/0012 156/221 |
| 2014/0234538 A1 | 8/2014 | Yamada et al. | |
| 2015/0111015 A1 | 4/2015 | Hino et al. | |
| 2015/0224748 A1 | 8/2015 | Onishi et al. | |
| 2015/0301233 A1 * | 10/2015 | Hoshino .................. | G02B 1/18 351/159.57 |
| 2016/0137879 A1 | 5/2016 | Miki et al. | |
| 2016/0271922 A1 | 9/2016 | Uzawa et al. | |

(Continued)

FOREIGN PATENT DOCUMENTS

| | | |
|---|---|---|
| CN | 1657975 | 8/2005 |
| CN | 1900198 | 1/2007 |

(Continued)

OTHER PUBLICATIONS

Michito Otsu et al., "Development and Application of Highly Weather-Resistant UV-Curable Resin", J. Jpn. Soc. Colour Mater., vol. 86, No. 9, pp. 340-344 (2013).
"Quantitative Evaluation of Scratch Resistance of Organic-Inorganic Hybrid Hard Coatings", JSR Technical Review, No. 122, pp. 1-2 (Mar. 2005).
Akihiko Ito et al., "Transparent Plastic Coating Using Radiation", Journal of the Atomic Energy Society of Japan, vol. 16, Issue 6, pp. 312-314 (Jun. 30, 1974).
"Acrylate Monomer and Methacrylate Monomer", from the homepage of Daicel Allnex Corporation (retrieved from http://www.daicel-allnex,.com/products/product01.htm) (Aug. 28, 2023).
Kazumasa Inada, "Adhesion of (Meth)acrylate-based Photocurable Resin", Toagosei Research Group Annual Report 19 Trend 2006, Issue 9, pp. 19-24 (Jan. 1, 2006).

(Continued)

*Primary Examiner* — Andrew D Graham
(74) *Attorney, Agent, or Firm* — Wenderoth, Lind & Ponack, L.L.P.

(57) ABSTRACT

Provided are a method of producing a curved member, the method containing preparing a polycarbonate resin laminate with a hard coat layer for heat bending that includes a permeation layer (B layer) and a hard coat layer (C layer) sequentially layered on at least one surface of a polycarbonate resin base material layer (A layer) having a thickness of from 0.1 mm to 20 mm, and satisfying the requirements (a) to (d), pre-heating the polycarbonate resin laminate at from a temperature higher than Tg by 5° C. to a temperature higher than Tg by 70° C., in which Tg (° C.) is a glass transition temperature of a polycarbonate resin of the prepared polycarbonate resin laminate, and curving the polycarbonate resin laminate obtained by the pre-heating by applying pressure to the polycarbonate resin laminate, and a polycarbonate resin laminate with a hard coat layer for heat bending.

16 Claims, 1 Drawing Sheet

(56) References Cited

U.S. PATENT DOCUMENTS

| | | | |
|---|---|---|---|
| 2016/0311204 A1 | 10/2016 | Onishi et al. | |
| 2016/0347930 A1* | 12/2016 | Okafuji | C08K 5/109 |
| 2017/0254936 A1* | 9/2017 | Morita | B32B 37/02 |
| 2018/0009959 A1 | 1/2018 | Nakashima et al. | |
| 2018/0072022 A1* | 3/2018 | Tsai | B32B 9/04 |
| 2019/0015868 A1 | 1/2019 | Masuda et al. | |
| 2019/0077134 A1* | 3/2019 | Konno | B32B 25/06 |
| 2019/0202173 A1* | 7/2019 | Fukatani | B32B 17/1066 |
| 2020/0122383 A1* | 4/2020 | Egashira | B32B 38/004 |
| 2020/0165364 A1* | 5/2020 | Higuchi | C08F 30/08 |
| 2020/0301229 A1* | 9/2020 | Yashiro | B29C 45/14811 |
| 2022/0274384 A1* | 9/2022 | Hirabayashi | B32B 27/308 |

FOREIGN PATENT DOCUMENTS

| | | |
|---|---|---|
| CN | 101052520 | 10/2007 |
| CN | 101468515 | 7/2009 |
| CN | 101522415 | 9/2009 |
| CN | 102026795 | 4/2011 |
| CN | 103201080 | 7/2013 |
| CN | 104254445 | 12/2014 |
| CN | 104718079 | 6/2015 |
| CN | 107108934 | 8/2017 |
| CN | 108472685 | 8/2018 |
| DE | 10 2007 017 978 | 10/2008 |
| EP | 1 162 246 | 12/2001 |
| EP | 3722093 | 10/2020 |
| JP | 10-95937 | 4/1998 |
| JP | 11-78515 | 3/1999 |
| JP | 2000-281817 | 10/2000 |
| JP | 2005-161652 | 6/2005 |
| JP | 2005-178035 | 7/2005 |
| JP | 2009-274255 | 11/2009 |
| JP | 2009-274256 | 11/2009 |
| JP | 2011-42071 | 3/2011 |
| JP | 2013-119553 | 6/2013 |
| JP | 2014-688 | 1/2014 |
| JP | 2014-205335 | 10/2014 |
| JP | 2014-208493 | 11/2014 |
| JP | 2015-112812 | 6/2015 |
| JP | 2017-65172 | 4/2017 |
| JP | 2017-177647 | 10/2017 |
| JP | 2018-34561 | 3/2018 |
| JP | 2018-051918 | 4/2018 |
| WO | 96/41831 | 12/1996 |
| WO | 2007/136282 | 11/2007 |
| WO | 2011/049186 | 4/2011 |
| WO | 2013/042661 | 3/2013 |
| WO | 2014/157149 | 10/2014 |
| WO | 2014/175369 | 10/2014 |
| WO | 2015/093516 | 6/2015 |
| WO | 2019/107462 | 6/2019 |
| WO | 2019/159890 | 8/2019 |

OTHER PUBLICATIONS

"Material Design and Coating Technology in Hard Coat Films Focused on Plastic Substrates and Improvement of Hardness", pp. 292-293, Technical Information Association Co., Ltd. (Apr. 2005).
"Chemical Resistance", Tarsons Products Japan General Agency, Toei Corporation Homepage (obtained from https://tarsons.jp/page03-04.html) (Sep. 4, 2023).
"Polycarbonate Plate—Comprehensive Technical Material", revised on May 1, 2021 (first edition, on Apr. 21, 1981) by Takiron C.I. Co., Ltd., pp. 1-2.
International Search Report issued Nov. 10, 2020 in International (PCT) Application No. PCT/JP2020/036273.

\* cited by examiner

METHOD OF PRODUCING CURVED MEMBER AND POLYCARBONATE RESIN LAMINATE WITH HARD COAT LAYER FOR HEAT BENDING

TECHNICAL FIELD

The present invention relates to a method of producing a curved member and a polycarbonate resin laminate with a hard coat layer for heat bending.

BACKGROUND ART

A polycarbonate resin is widely used in electricity, machines, automobiles, and medical use because it has excellent transparency, heat resistance, mechanical strength, and the like. In recent years, the polycarbonate resin has been widely used for various transparent members (hereinafter, also referred to as the "glazing member") due to the various excellent features described above. Among them, application to a vehicle transparent member (hereinafter, also referred to as the "vehicle glazing member") for the purpose of weight reduction has been widely attempted. Examples of the vehicle glazing member include a headlamp lens, a resin window glass, a rear lamp lens, and a meter cover. These members are characterized in that the shape is complicated and large, and the requirement for the quality of a molded article is extremely high.

In the vehicle glazing member, a polycarbonate resin composition having excellent releasability, a reduced internal strain of a molded article, and improved crack resistance in addition to excellent transparency, weather resistance, and molding heat resistance is required.

In addition, as a method that can efficiently produce a member having a high-quality design surface required for the glazing member at low cost, for example, International Patent Publication No. 2011/049186 discloses a method of producing a curved member having a high-quality design surface, the method including steps of (1) preparing a sheet having a high-quality design surface by injection compression molding of a resin material containing a thermoplastic resin (step (1)), (2) pre-heating and softening the sheet at a temperature of from (Tg+5) to (Tg+70)° C., in which Tg(° C.) is a glass transition temperature of the resin material (step (2)), and (3) applying pressure to the softened sheet to curve the high-quality design surface (step (3)).

SUMMARY OF INVENTION

Technical Problem

WO 2011/049186 discloses a laminate in which a hard coat layer is layered on a sheet base material. In a case in which the hard coat layer is provided on the base material, high adhesion between the base material and the hard coat layer is required. In particular, in the production of the curved member, it is important to have excellent adhesion between the base material and the hard coat layer even after heat bending. However, WO 2011/049186 does not focus on adhesion after heat bending. In addition, in the production of the curved member, abrasion resistance and heat bendability are also required.

As a result of intensive studies conducted by the present inventors, it has been found that there is room for improvement of abrasion resistance, heat bendability, and adhesion after heat bending in the method of producing a curved member described in WO 2011/049186.

According to an embodiment of the invention, a method of producing a curved member having excellent abrasion resistance, heat bendability, and adhesion after heat bending is provided.

According to another embodiment of the invention, a polycarbonate resin laminate with a hard coat layer for heat bending that has excellent abrasion resistance, heat bendability, and adhesion after heat bending is provided.

Solution to Problem

The invention includes the following aspects.

<1> A method of producing a curved member, the method comprising:
preparing a polycarbonate resin laminate with a hard coat layer for heat bending, the polycarbonate resin laminate including a permeation layer (B layer) and a hard coat layer (C layer) sequentially layered on at least one surface of a polycarbonate resin base material layer (A layer) having a thickness of from 0.1 mm to 20 mm, and satisfying the following requirements (a) to (d);
pre-heating the polycarbonate resin laminate at from a temperature higher than Tg by 5° C. to a temperature higher than Tg by 70° C., wherein Tg (° C.) is a glass transition temperature of a polycarbonate resin of the prepared polycarbonate resin laminate; and
curving the polycarbonate resin laminate obtained by the pre-heating by applying pressure to the polycarbonate resin laminate:
(a) the B layer contains all components of the A layer and at least a portion of components of the C layer,
(b) a thickness of the B layer is from 2 μm to 9 μm,
(c) a proportion of the thickness of the B layer with respect to a total thickness of the B layer and the C layer is from 20% to 70%, and
(d) the C layer contains a polyfunctional (meth)acrylate, and at least one of inorganic fine particles or a hydrolysis condensate of a silicon compound,
wherein a content of the polyfunctional (meth)acrylate and a content of the at least one of inorganic fine particles or a hydrolysis condensate of a silicon compound are from 35% by mass to 95% by mass and from 5% by mass to 65% by mass, respectively, with respect to a total amount of the polyfunctional (meth)acrylate and the at least one of inorganic fine particles or a hydrolysis condensate of a silicon compound.
<2> The method of producing a curved member according to <1>, wherein the curving step includes curving the polycarbonate resin laminate such that at least one side of the C layer of the polycarbonate resin laminate has a convex face shape.
<3> The method of producing a curved member according to <1> or <2>, further comprising, before the pre-heating, performing printing on a surface of the C layer of the polycarbonate resin laminate.
<4> The method of producing a curved member according to any one of <1> to <3>, wherein a viscosity average molecular weight of the polycarbonate resin in the A layer is from 20,000 to 30,000.
<5> The method of producing a curved member according to any one of <1> to <4>, wherein a total thickness of the B layer and the C layer is from 10 μm to 32 μm.
<6> The method of producing a curved member according to any one of <1> to <5>, wherein an addition polymerization reaction rate of a (meth)acryloyl group of the polyfunctional (meth)acrylate is from 30% to 70%.

<7> A polycarbonate resin laminate with a hard coat layer for heat bending, comprising a permeation layer (B layer) and a hard coat layer (C layer) sequentially layered on at least one surface of a polycarbonate resin base material layer (A layer) having a thickness of from 0.1 mm to 20 mm, wherein:
the polycarbonate resin laminate satisfies the following requirements (a) to (d), and
the B layer contacts with the A layer and the C layer:
(a) the B layer contains all components of the A layer and at least a portion of components of the C layer,
(b) a thickness of the B layer is from 2 µm to 9 µm,
(c) a proportion of the thickness of the B layer with respect to a total thickness of the B layer and the C layer is from 20% to 70%, and
(d) the C layer contains a polyfunctional (meth)acrylate, and at least one of inorganic fine particles or a hydrolysis condensate of a silicon compound,
wherein a content of the polyfunctional (meth)acrylate and a content of the at least one of inorganic fine particles or a hydrolysis condensate of a silicon compound are from 35% by mass to 95% by mass and from 5% by mass to 65% by mass, respectively, with respect to a total amount of the polyfunctional (meth)acrylate and the at least one of inorganic fine particles or a hydrolysis condensate of a silicon compound.
<8> The polycarbonate resin laminate with a hard coat layer for heat bending according to <7>, wherein a viscosity average molecular weight of a polycarbonate resin in the layer A is from 20,000 to 30,000.
<9> The polycarbonate resin laminate with a hard coat layer for heat bending according to <7> or <8>, wherein a total thickness of the B layer and the C layer is from 10 µm to 32 µm.
<10> The polycarbonate resin laminate with a hard coat layer for heat bending according to any one of <7> to <9>, wherein an addition polymerization reaction rate of a (meth)acryloyl group of the polyfunctional (meth)acrylate is from 30% to 70%.

Advantageous Effects of Invention

According to an embodiment of the invention, a method of producing a curved member having excellent abrasion resistance, heat bendability, and adhesion after heat bending can be provided.

According to another embodiment of the invention, a polycarbonate resin laminate with a hard coat layer for heat bending that has excellent abrasion resistance, heat bendability, and adhesion after heat bending can be provided.

DESCRIPTION OF EMBODIMENTS

Figure 1:
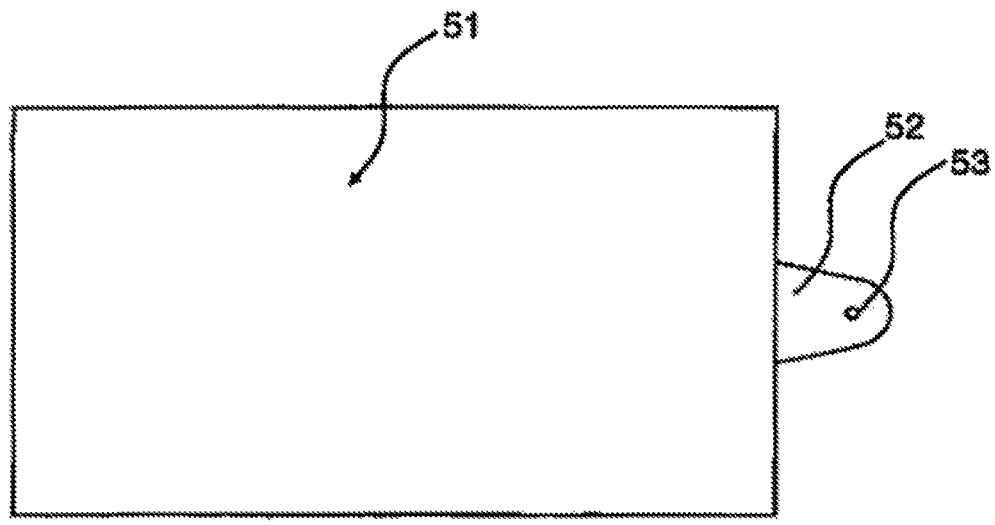
FIG. 1 is a view showing a shape of a sheet-α produced in an Example.

Hereinafter, the contents of the present disclosure will be described in detail. The description of constituent elements set forth below may be made based on representative embodiments of the disclosure, but the disclosure is not limited to these embodiments.

Herein, "from ~to" representing a numerical range is used to mean that the numerical range includes the numerical values described before and after "from ~to" as a lower limit and an upper limit, respectively.

In addition, in a case in which a group (atomic group) is herein noted with neither substitution nor unsubstitution being mentioned, the concept thereof encompasses a group having no substituent and a group having a substituent. For example, the term "alkyl group" includes not only an alkyl group (unsubstituted alkyl group) having no substituent, but also an alkyl group (substituted alkyl group) having a substituent.

Herein, the concept of "(meth)acryl" encompasses both acryl and methacryl, and the concept of "(meth)acryloyl" encompasses both acryloyl and methacryloyl.

Herein, the term "step" includes not only an independent step, but also a step that can achieve a predetermined object even in the case of being not clearly distinguished from other steps. In the disclosure, "% by mass" has the same definition as that of "% by weight", and "part(s) by mass" has the same definition as that of "part(s) by weight".

In the disclosure, a composition may contain only one or two or more components in combination and a polymer may have only one or two or more structural units in combination, unless otherwise specified.

Further, in the disclosure, in a case in which the polymer contains a plurality of materials corresponding to each structural unit or a plurality of structural units, the amount of each structural unit in the polymer means that the total amount of the plurality of structural units corresponding to each structural unit in the polymer, unless otherwise specified.

Further, in the disclosure, a combination of two or more preferred aspects is a more preferred aspect.

Method of Producing Curved Member

A method of producing a curved member according to the disclosure includes:
preparing a polycarbonate resin laminate with a hard coat layer for heat bending (hereinafter, may be simply referred to as the "laminate"), the polycarbonate resin laminate including a permeation layer (B layer) and a hard coat layer (C layer) sequentially layered on at least one surface of a polycarbonate resin base material layer (A layer) having a thickness of from 0.1 mm to 20 mm, and satisfying the following requirements (a) to (d);
pre-heating the polycarbonate resin laminate at from a temperature higher than Tg by 5° C. to a temperature higher than Tg by 70° C., in which Tg (° C.) is a glass transition temperature of a polycarbonate resin of the prepared polycarbonate resin laminate; and
curving the polycarbonate resin laminate obtained by the pre-heating by applying pressure to the polycarbonate resin laminate:
(a) the B layer contains all components of the A layer and at least a portion of components of the C layer,
(b) a thickness of the B layer is from 2 µm to 9 µm,
(c) a proportion of the thickness of the B layer with respect to a total thickness of the B layer and the C layer is from 20% to 70%, and
(d) the C layer contains a polyfunctional (meth)acrylate, and at least one of inorganic fine particles or a hydrolysis condensate of a silicon compound,
in which a content of the polyfunctional (meth)acrylate and a content of the at least one of inorganic fine particles or a hydrolysis condensate of a silicon compound are from 35% by mass to 95% by mass and from 5% by mass to 65% by mass, respectively, with respect to a total amount of the polyfunctional (meth)acrylate and the at least one of inorganic fine particles or a hydrolysis condensate of a silicon compound.

In general, when the polycarbonate resin laminate with a hard coat layer is subjected to heat bending, cracks may occur in the hard coat layer of the laminate.

As a reason for the occurrence of cracks, it is presumed that since adhesion at an interface between the polycarbonate resin layer and the hard coat layer is insufficient, micro-level peeling occurs at the interface between the polycarbonate resin layer and the hard coat layer, which is difficult to be determined from only the appearance after heat bending, and the hard coat layer cannot follow the polycarbonate layer and is thus bent at a steep angle, which causes cracks.

Therefore, as a result of conducting intensive studies, the inventors have found that a curved member having excellent abrasion resistance, heat bendability, and adhesion after heat bending is obtained by a production method that includes a step of pre-heating a polycarbonate resin laminate with a hard coat layer for heat bending that includes a permeation layer (B layer) and a hard coat layer (C layer) sequentially layered on at least one surface of a polycarbonate resin base material layer (A layer) having a predetermined thickness under a predetermined temperature condition, and a step of curving the obtained polycarbonate resin laminate with a hard coat layer for heat bending by applying pressure to the polycarbonate resin laminate.

Although the detailed mechanism by which the above effect is obtained is not clear, it is presumed as follows.

The hard coat layer (C layer) contains a specific amount of a polyfunctional (meth)acrylate and a specific amount of at least one of inorganic fine particles or a hydrolysis condensate of a silicon compound. Each of the polyfunctional (meth)acrylate and the at least one of inorganic fine particles or a hydrolysis condensate of a silicon compound has a dissolution parameter close to that of an aromatic polycarbonate, and has high affinity and a large intermolecular force at the interface. Furthermore, since the B layer in the polycarbonate resin laminate with a hard coat layer for bending used in the method of producing a curved member according to the disclosure contains both components of the A layer and the C layer, it is presumed that the C layer and the A layer have excellent heat bendability due to more excellent adhesion of the entire laminate with the B layer interposed therebetween.

In addition, since the hard coat layer (C layer) contains a specific amount of the polyfunctional (meth)acrylate, it is presumed that a polymerizable double bond in the polyfunctional (meth)acrylate is cured by an active energy ray such as an ultraviolet ray to form a three-dimensional crosslink in the C layer, and the C layer also has excellent abrasion resistance and adhesion after heat bending.

Hereinafter, each step in the method of producing a curved member according to the disclosure will be described in detail.

Step of Preparing Laminate

The polycarbonate resin laminate with a hard coat layer for heat bending used in the step of preparing the laminate in the method of producing a curved member according to the disclosure includes a permeation layer (B layer) and a hard coat layer (C layer) sequentially layered on at least one surface of a polycarbonate resin base material layer (A layer) having a thickness of from 0.1 mm to 20 mm, and satisfies the requirements (a) to (d).

Hereinafter, the laminate will be described in detail.

Laminate

In the laminate used in the method of producing a curved member according to the disclosure, the permeation layer (B layer) and the hard coat layer (C layer) are layered on both surfaces of the polycarbonate resin base material layer (A layer), and the B layer is in contact with the A layer and the C layer.

In the laminate according to the disclosure, another layer may be layered on the hard coat layer (C layer), if necessary. Examples of the other layer include a decorative layer.

A screen printing and the like are known as a method of forming a decorative layer.

A Layer

The polycarbonate resin used for the polycarbonate resin layer (A layer) is preferably an aromatic polycarbonate resin obtained by reacting a dihydric phenol with a carbonate precursor.

Examples of the reaction method include an interfacial polycondensation method, a melt transesterification method, a solid-phase transesterification method of a carbonate prepolymer, and a ring opening polymerization method of a cyclic carbonate compound.

Representative examples of the dihydric phenol used here include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (commonly known as bisphenol A), 2,2-bis{(4-hydroxy-3-methyl)phenyl}propane, 2,2-bis{(4-hydroxy-3,5-dimethyl)phenyl}propane, 2,2-bis{(3-isopropyl)-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether, and 4,4'-dihydroxydiphenyl ester, and these dihydric phenols can be used singly, or in mixture of two or more kinds thereof.

A homopolymer or copolymer obtained by at least one kind of bisphenol selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane, and α,α'-bis(4-hydroxyphenyl)-m-diisopropylbenzene among the dihydric phenols is preferable. In particular, a homopolymer of bisphenol A or a copolymer of 1,1-bis(4-hydroxyphenyl)-3,3,5-trimethylcyclohexane and bisphenol A, 2,2- bis{(4-hydroxy-3-methyl)phenyl}propane, or α,α'-bis(4-hydroxyphenyl)-m-diisopropylbenzene is more preferably used.

Examples of the carbonate precursor include a carbonyl halide, a carbonate ester, and a haloformate, and specific examples thereof include phosgene, diphenyl carbonate, and a dihaloformate of a dihydric phenol.

A method of synthesizing a polycarbonate resin by an interfacial polycondensation method and a transesterification method will be briefly described below.

In the interfacial polycondensation method using phosgene as a carbonate precursor, a reaction between a dihydric phenol and phosgene is usually carried out in the presence of an acid binder and an organic solvent. As the acid binder, for example, a hydroxide of an alkali metal such as sodium hydroxide or potassium hydroxide, or an amine compound such as pyridine is used. As the organic solvent, for example, a halogenated hydrocarbon such as methylene chloride or chlorobenzene is used. In order to accelerate the reaction, for example, a catalyst such as a tertiary amine or a quaternary ammonium salt can be used, and it is desirable to use, as a molecular weight modifier, a terminating agent such as an alkyl-substituted phenol such as phenol or p-tert-butylphenol.

It is preferable that a reaction temperature is usually from 0° C. to 40° C., a reaction time is from 10 minutes to 5 hours, and a pH during the reaction is kept at 10 or more.

The transesterification method (melting method) using a carbonic acid ester as the carbonate precursor is a method of stirring a dihydric phenol component and a carbonic acid diester at a predetermined ratio under the presence of an inert gas while being heated, and distilling off a produced alcohol or phenol.

The reaction temperature varies depending on a boiling point or the like of the produced alcohol or phenol, and is usually preferably in a range of from 120° C. to 350° C. As the reaction method, it is preferable to perform a reaction while distilling off the produced alcohol or phenol by reducing the pressure from the initial stage.

In order to accelerate the reaction, a usual transesterification catalyst can be used. Examples of the carbonic acid diester used in the transesterification reaction include diphenyl carbonate, dinaphthyl carbonate, dimethyl carbonate, diethyl carbonate, and dibutyl carbonate, and diphenyl carbonate is particularly preferable.

(a) A viscosity average molecular weight of polycarbonate contained in the polycarbonate resin base material layer (A layer) is preferably from 17,000 to 40,000, and more preferably from 20,000 to 30,000 when obtained by an interfacial polycondensation method or a transesterification method.

When the viscosity average molecular weight of the polycarbonate resin is from 17,000 to 40,000, the obtained laminate has sufficient strength and excellent melt flowability and has more excellent abrasion resistance, heat bendability, and adhesion after heat bending.

The viscosity average molecular weight (M) referred to here is determined by the following Schnell viscosity equation in which a limiting viscosity [η] is determined at 20° C. by measuring the polycarbonate resin containing methylene chloride as a solvent using an Ostwald viscometer.

$$[\eta]=1.23\times10^{-4} M^{0.83}$$

The polycarbonate resin base material layer (A layer) may contain a polycarbonate resin having a viscosity average molecular weight out of from 17,000 to 40,000 and a resin other than the polycarbonate resin, and it is preferable that the polycarbonate resin base material layer (A layer) does not contain the resin other than the polycarbonate resin.

In the polycarbonate resin base material layer (A layer), a content of the polycarbonate resin having a viscosity average molecular weight of from 17,000 to 40,000 is preferably 85% by mass or more, more preferably 90% by mass or more, still more preferably 95% by mass or more, and particularly preferably 100% by mass, with respect to the total mass of the A layer, from the viewpoint of the abrasion resistance, the heat bendability, and the adhesion after heat bending.

A common additive such as a heat stabilizer, a releasing agent, an infrared absorber, an ultraviolet absorber, an antioxidant, a light stabilizer, a foaming agent, a reinforcing agent (for example, talc, mica, clay, wollastonite, calcium carbonate, a glass fiber, a glass bead, a glass balloon, a milled fiber, a glass flake, a carbon fiber, a carbon flake, a carbon bead, a carbon milled fiber, a metal flake, a metal fiber, a metal-coated glass fiber, a metal-coated carbon fiber, a metal-coated glass flake, silica, a ceramic particle, a ceramic fiber, an aramid particle, an aramid fiber, a polyarylate fiber, graphite, conductive carbon black, and various wiskers), a flame retardant (for example, halogen-based flame retardant, a phosphate ester-based flame retardant, a metal salt-based flame retardant, red phosphorus, a silicon-based flame retardant, a fluorine-based flame retardant, and a metal hydrate-based flame retardant), a colorant (for example, carbon black, a pigment such as titanium oxide, and a dye), a light diffusing agent (for example, an acrylic crosslinked particle, a silicon crosslinked particle, an ultrathin glass flake, and a calcium carbonate particle), a fluorescent brightening agent, a luminous pigment, a fluorescent dye, an antistatic agent, a flow modifier, a crystal nucleating agent, an inorganic and organic antibacterial agent, a photocatalytic antifouling agent (for example, a titanium oxide fine particle and a zinc oxide fine particle), an impact modifier typified by graft rubber, or a photochromic agent can be mixed with the polycarbonate resin as long as light permeability is not impaired depending on the intended use.

Any method is employed to prepare the polycarbonate resin. Examples thereof include a method in which a polycarbonate resin raw material and optionally other additives are sufficiently mixed using a pre-mixing means such as a V-type blender, a Henschel mixer, a mechanochemical device, or an extrusion mixer, granulation is performed by a granulator such as an extrusion granulator or a briquetting machine as the case may be, and then melt-kneading by a melt kneader typified by a vented twin-screw extruder and pelletization by a device such as a pelletizer are performed.

In addition, examples thereof include a method in which the respective components are independently supplied to a melt kneader typified by a vented twin-screw extruder, and a method in which some of the respective components are pre-mixed and then supplied to a melt kneader independently of the remaining components. Examples of the method of pre-mixing some of the respective components include a method in which a phosphorus-based stabilizer, a hindered phenol-based antioxidant, and the like are pre-mixed in advance, and then, the mixture is mixed with a polycarbonate resin or directly supplied to an extruder.

Examples of the pre-mixing method include a method in which a part of a powder and an additive to be blended are blended to form a masterbatch of the additive diluted with the powder, and a method in which one component is further independently supplied from a melt extruder, when the mixture has a powder form. In a case in which the component to be blended has a liquid component, a so-called liquid injection device or a liquid addition device can be used for supply to the melt extruder.

As the extruder, an extruder having a vent capable of degassing moisture in a raw material and volatile gas generated from a melt-kneaded resin or the like can be preferably used. A vacuum pump for efficiently discharging the generated moisture and volatile gas from the vent to the outside of the extruder is preferably installed. In addition, it is also possible to install a screen for removing foreign substances and the like mixed in the extrusion raw material in a zone in front of an extruder die to remove the foreign substances from the resin composition.

Examples of the screen include a metallic mesh, a screen changer, and a sintered metal plate (for example, a disc filter).

Examples of the melt-kneader include a Banbury mixer, a kneading roll, a single-screw extruder, and a multi-screw extruder having three or more screws, in addition to the twin-screw extruder.

It is preferable that an extruded resin is directly cut and pelletized, or a strand is formed and then pelletized by cutting the strand with a pelletizer. In a case in which it is necessary to reduce the influence of external dust or the like during pelletization, it is preferable to clean the atmosphere around the extruder.

Usually, various products can be produced by injection molding polycarbonate resin pellets to obtain a molded article.

Examples of the injection molding include injection compression molding, injection press molding, gas-assist injection molding, insert molding, in-mold coating molding, heat insulation molding, rapid heating and cooling mold molding, two-color molding, sandwich molding, and ultra-high speed injection molding, in addition to a general molding method.

The molding can be selected from a cold runner method and a hot runner method.

The polycarbonate resin can also be used in the form of various profile extrusion molded articles, a sheet, a film, and the like by extrusion molding. As the molding of the sheet or the film, methods such as an inflation method, a calendar method, and a casting method can also be used. Further, it is also possible to mold a heat-shrinkable tube by applying a specific stretching operation. It is also possible to form a hollow molded article from the polycarbonate resin by a molding method such as rotation molding or blow molding.

A thickness of the polycarbonate resin base material layer (A layer) is from 0.1 mm to 20 mm, preferably from 1 mm to 20 mm, and more preferably from 3 mm to 15 mm.

The thickness of the polycarbonate resin base material layer (A layer) is determined by measuring a thickness of the laminate according to the disclosure with a micrometer and subtracting the thicknesses of the B layer and the C layer measured with a scanning electron microscope (SEM) from the thickness of the laminate.

The thicknesses of the B layer and the C layer are determined by measuring a cross section of the laminate according to the disclosure with a scanning electron microscope (SEM).

B Layer (a) The B layer contains all components of the A layer and at least a portion of components of the C layer. The B layer contains both components of the A layer and the C layer, such that adhesion of each layer can be improved, and a curved member having excellent heat bendability can be obtained.

Both the components of the A layer and the C layer contained in the B layer are confirmed by micro-infrared spectroscopy (micro FT-IR method).

Specifically, the laminate according to the disclosure is cut and a cross section of the B layer is analyzed using a micro FT-IR measuring apparatus to confirm the presence or absence of mixing of a peak (1,780 cm$^{-1}$) derived from a carbonate bond and a peak (near 1,740 cm$^{-1}$) derived from an acrylic ester. Thus, it can be confirmed that both the components of the A layer and the C layer are mixed, that is, the B layer contains both the components of the A layer and the C layer.

From the viewpoint of excellent abrasion resistance, heat bendability, and adhesion after heat bending, the B layer preferably contains the components of the A layer and the components of the C layer except for silica fine particles, and more preferably contains a polycarbonate resin, a polyfunctional (meth)acrylate, and a hydrolysis condensate of a silicon compound.

(b) A thickness of the B layer is from 2 µm to 9 µm. When the thickness of the B layer is 2 µm or more, the adhesion after heat bending is excellent, and when the thickness of the B layer is 9 µm or less, the abrasion resistance and the heat bendability are excellent. The thickness of the B layer is preferably from 3 µm to 8 µm, from the viewpoint of excellent abrasion resistance, heat bendability, and adhesion after heat bending of the obtained laminate. The thickness of the B layer can be measured with a scanning electron microscope (SEM).

The total thickness of the B layer and the C layer is preferably from 10 µm to 32 µm. When the total thickness of the B layer and the C layer is 10 µm or more, weather resistance is excellent, and when the total thickness is 32 µm or less, the stress at the interface between the B layer and the A layer does not become too large due to a difference in curing shrinkage or linear expansion, and the adhesion after heat bending is excellent because active energy rays such as ultraviolet rays reach the interface between the B layer and the A layer during curing and a C2 component in the B layer near the interface with the A layer also undergoes a sufficient addition reaction.

From the viewpoint of the abrasion resistance, the heat bendability, and the adhesion after heat bending, the total thickness of the B layer and the C layer is preferably from 15 µm to 30 µm, more preferably from 18 µm to 28 µm, and still more preferably from 18 µm to 25 µm.

The total thickness of the B layer and the C layer can be measured with a scanning electron microscope (SEM).

(c) A proportion of the thickness of the B layer with respect to the total thickness of the B layer and the C layer is from 20% to 70%. When the proportion of the thickness of the B layer with respect to the total thickness of the B layer and the C layer is from 20% to 70%, abrasion resistance, heat bendability, and adhesion after heat bending of the obtained curved member are excellent. From the above viewpoint, it is preferably from 20% to 55% and particularly preferably from 20% to 45%.

C Layer (d) The C layer contains a polyfunctional (meth)acrylate, and at least one of inorganic fine particles or a hydrolysis condensate of a silicon compound, and a content of the polyfunctional (meth)acrylate and a content of the at least one of inorganic fine particles or a hydrolysis condensate of a silicon compound are from 35% by mass to 95% by mass and from 5% by mass to 65% by mass, respectively, with respect to the total amount of the polyfunctional (meth)acrylate and the at least one of inorganic fine particles or a hydrolysis condensate of a silicon compound.

Method of Forming B Layer and C Layer

A method of forming a B layer and a C layer is not particularly limited, and the B layer and the C layer may be separately formed, or the B layer and the C layer may be simultaneously formed. For example, the method of forming a B layer and a C layer may be a method of forming a B layer by applying a polyfunctional (meth)acrylate contained in a C layer and an inorganic fine particle dispersion containing at least one of inorganic fine particles or a hydrolysis condensate of a silicon compound (hereinafter, also simply referred to as the "inorganic fine particle dispersion") to one surface of an A layer and forming a C layer by applying an inorganic fine particle dispersion for forming a C layer on the B layer, or a method of forming a C layer and a B layer by applying an inorganic fine particle dispersion for forming a C layer.

In the B layer, among the components forming the C layer, a difference in solubility parameter between the polyfunctional (meth)acrylate and the polycarbonate resin constituting the A layer is preferably 10 $((MPa)^{1/2})$ or less.

When the difference in solubility parameter is within the above range, a permeation layer (B layer) in which both the components of the layer A and the C layer are mixed by diffusion due to molecular motion can be formed on a contact surface after applying the C layer to the A layer.

Specific examples of the method of simultaneously forming a B layer and a C layer include a method of forming a B layer and a C layer by applying an inorganic fine particle dispersion to at least one surface of an A layer and then drying the inorganic fine particle dispersion, but are not limited thereto.

In a case in which the B layer and the C layer are simultaneously formed, an inorganic fine particle dispersion is preferably prepared so that only a portion of components of an inorganic fine particle dispersion contribute to the formation of the B layer. In this case, the composition of the inorganic fine particle dispersion and the composition of the C layer do not necessarily coincide with each other.

In the case of the method of simultaneously forming a B layer and a C layer, the thickness of the B layer can be appropriately adjusted by changing a drying temperature and a drying time.

The drying method of the inorganic fine particle dispersion is not limited, and examples thereof include drying methods such as natural drying, air drying, and heating.

The drying temperature is preferably from 65° C. to 95° C. and more preferably from 70° C. to 85° C.

The drying time is preferably from 5 minutes to 20 minutes, more preferably from 5 minutes to 15 minutes, and still more preferably from 5 minutes to 13 minutes, from the viewpoint of weather resistance.

Examples of a method of measuring a content ratio of the polyfunctional (meth)acrylate and the at least one of inorganic fine particles or a hydrolysis condensate of a silicon compound in the C layer include the following methods. First, the C layer of the laminate is scraped off, and the type of the compound present in the C layer is analyzed by pyrolysis gas chromatography. Furthermore, abundance ratios of a peak (near 1,740 $cm^{-1}$) derived from the polyfunctional (meth)acrylate and a peak (near 1,100 $cm^{-1}$ in the case of silica) derived from the at least one of inorganic fine particles or a hydrolysis condensate of a silicon compound are compared by infrared spectroscopy (ART-IR) by a composition specification method by elemental analysis or a C layer surface attenuation total reflection measurement method performed on the surface of the C layer of the laminate, or cutting the laminate in a thickness direction and measuring a cross section of the C layer with a transmission type IR.

The method of applying the inorganic fine particle dispersion to the A layer is not particularly limited, and examples thereof include known common coating methods such as a brush coating method, a roller coating method, a spray coating method, a dip coating method, a flow coater coating method, a roll coater coating method, and an electrodeposition coating method.

The thickness of the C layer is not particularly limited. However, from the viewpoint of the abrasion resistance, the heat bendability, and the adhesion after heat bending, the thickness of the C layer is preferably in a range of from 7 μm to 26 μm, more preferably in a range of from 8 μm to 24 μm, and still more preferably from 10 μm to 15 μm.

The thickness of the C layer is determined by the methods described above similarly to the thickness of the A layer.

Polyfunctional Acrylate

A polyfunctional (meth)acrylate monomer used for forming a C layer is not particularly limited as long as it has two or more (meth)acrylate groups in one molecule, and examples thereof include a bifunctional (meth)acrylate monomer such as trimethylolpropane di(meth)acrylate, ethylene oxide-modified trimethylolpropane di(meth)acrylate, propylene oxide-modified trimethylolpropane di(meth)acrylate, glycerin di(meth)acrylate, or bis(2-(meth)acryloyloxyethyl)hydroxyethyl isocyanurate, a trifunctional (meth)acrylate monomer such as pentaerythritol tri(meth)acrylate or ditrimethylolpropane tri(meth)acrylate, and a tetrafunctional or higher (meth)acrylate monomer such as pentaerythritol tetra(meth)acrylate or dipentaerythritol penta(meth)acrylate.

Among them, the polyfunctional (meth)acrylate monomer for forming a C layer is preferably a bifunctional to tetrafunctional (meth)acrylate monomer, and more preferably a bifunctional or trifunctional (meth)acrylate monomer.

Herein, the polyfunctional (meth)acrylate monomer refers to a polyfunctional (meth)acrylate monomer having a molecular weight of less than 2,000.

The C layer may be formed using a monofunctional (meth)acrylate monomer for a balance between the abrasion resistance and the heat bendability. In this case, the amount of the polyfunctional (meth)acrylate monomer is preferably 90% by mass or more, more preferably 93% by mass or more, and still more preferably 96% by mass or more, with respect to the total mass of the (meth)acrylate monomer.

Di(meth)acrylate Compound

The bifunctional (meth)acrylate monomer used for forming a C layer may be an aliphatic or aromatic di(meth)acrylate compound, and is preferably an aliphatic di(meth)acrylate compound The aliphatic di(meth)acrylate compound is preferably a compound obtained by esterifying and bonding an alkyl diol and acrylic acid or methacrylic acid.

Examples of a preferred structure of the aliphatic di(meth)acrylate compound include 1,6-hexanediol diacrylate, 1,9-nonanediol diacrylate, and 1,10-decanediol diacrylate.

The aliphatic di(meth)acrylate compound may be synthesized or a commercially available product may be used. As the commercially available product, for example, HDDA (manufactured by Daicel-Allnex LTD.), A-HD-N, A-NOD-N, and A-DOD-N (manufactured by SHIN-NAKAMURA CHEMICAL Co., Ltd.), or 1,9-DA (manufactured by Kyoei Kagaku Kogyo Co., Ltd.) can be used.

The aliphatic di(meth)acrylate monomers may be used singly, or in combination of two or more kinds thereof.

In a case in which the polyfunctional (meth)acrylate monomer contains an aliphatic di(meth)acrylate compound, a blending ratio of the aliphatic di(meth)acrylate compound is preferably from 10% by mass to 80% by mass, more preferably from 20% by mass to 70% by mass, and still more preferably from 25% by mass to 60% by mass, with respect to the total mass of the polyfunctional (meth)acrylate monomer.

Tri(meth)acrylate Compound

The trifunctional (meth)acrylate monomer used for forming a C layer may be an aliphatic tri(meth)acrylate monomer or an aromatic tri(meth)acrylate monomer, and is preferably an aliphatic tri(meth)acrylate monomer or an aromatic ring tri(meth)acrylate monomer that may contain a heteroatom, and more preferably an aliphatic tri(meth)acrylate compound or a tri(meth)acrylate monomer having an isocyanuric ring.

The aliphatic tri(meth)acrylate monomer is preferably pentaerythritol tri(meth)acrylate, ditrimethylolpropane tri(meth)acrylate, or dipentaerythritol penta(meth)acrylate, and more preferably pentaerythritol tri(meth)acrylate or pentaerythritol tetra(meth)acrylate.

Isocyanuric Ring-Containing Tri(meth)acrylate Monomer

An isocyanuric ring-containing tri(meth)acrylate monomer used for forming a C layer is preferably a compound represented by the following Formula (5).

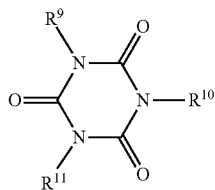

(5)

In Formula (5), each of $R^9$, $R^{10}$, and $R^{11}$ independently represents a group represented by the following Formula (5-a).

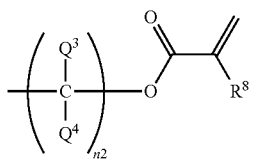

(5-a)

In Formula (5-a), n2 represents an integer from 2 to 4, $R^8$ represents a hydrogen atom or a methyl group, and each of $Q^3$ and $Q^4$ independently represents a hydrogen atom or an alkyl group having from 1 to 5 carbon atoms in a repeating unit.

Examples of a preferred structure of the isocyanuric ring-containing tri(meth)acrylate monomer include a compound having a structure represented by the following (5A).

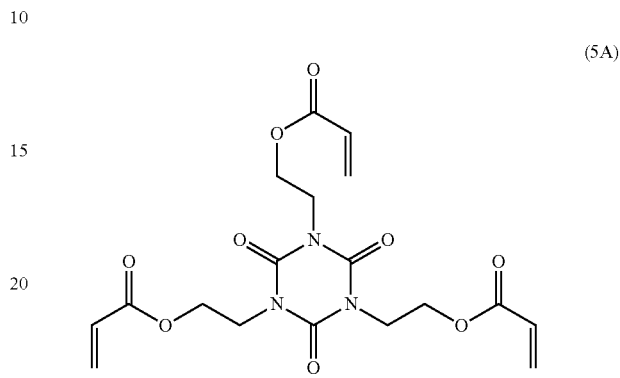

(5A)

The isocyanuric ring-containing tri(meth)acrylate monomer may be synthesized or a commercially available product may be used. As the commercially available product, for example, M-315 (manufactured by Toagosei Co., Ltd.), A9300 (manufactured by Shin Nakamura Chemical Industry Co., Ltd.), FA-731A (manufactured by Hitachi Chemical Co., Ltd.), SR368 (manufactured by Sartomer), or M-370 (manufactured by Miwon Specialty Chemical Co., Ltd.) can be used.

Blending Ratio of Isocyanuric Ring-Containing Tri(meth)acrylate Compound Monomer A blending ratio of an isocyanuric ring-containing tri(meth)acrylate compound monomer used for forming a C layer is preferably from 20% by mass to 70% by mass, more preferably from 30% by mass to 69% by mass, and still more preferably from 35% by mass to 68% by mass, with respect to the total mass of the polyfunctional (meth)acrylate monomer.

From the viewpoint of a balance between hardness and flexibility, abrasion resistance, heat bendability, and adhesion after heat bending, the polyfunctional (meth)acrylate monomer used for forming a C layer is particularly preferably a bifunctional (meth)acrylate (preferably an aliphatic di(meth)acrylate monomer, and more preferably a compound obtained by esterifying and binding an alkyl diol and acrylic acid or methacrylic acid) and a trifunctional (meth)acrylate monomer (preferably an aliphatic tri(meth)acrylate monomer or a tri(meth)acrylate monomer having an isocyanuric ring, more preferably pentaerythritol tri(meth)acrylate, dimethylolpropane tri(meth)acrylate, or a compound represented by Formula (5), and still more preferably pentaerythritol tri(meth)acrylate or a compound having a structure represented by (5A)).

The polyfunctional (meth)acrylate contained in the C layer is preferably a polymer of the polyfunctional (meth)acrylate monomer described above (polyfunctional (meth)acrylate polymer).

The polyfunctional (meth)acrylate polymer may be an oligomer from the viewpoint of the balance between the abrasion resistance and the heat bendability.

Herein, the polyfunctional (meth)acrylate oligomer refers to a polymer of a polyfunctional (meth)acrylate having a weight average molecular weight of from 2,000 or more to less than 50,000. Herein, the polyfunctional (meth)acrylate polymer refers to a polymer of a polyfunctional (meth) acrylate having a weight average molecular weight of from 50,000 or more.

The weight average molecular weight of the polymer of the polyfunctional (meth)acrylate monomer is preferably 50,000 or more, more preferably 100,000 or more, and still more preferably 200,000 or more, from the viewpoint of the abrasion resistance and the heat bendability.

The polyfunctional (meth)acrylate polymer may be a homopolymer or a copolymer, and is more preferably a copolymer.

Content of Polyfunctional (Meth)acrylate

The polyfunctional (meth)acrylates contained in the C layer (preferably the polyfunctional (meth)acrylate polymers) may be used singly, or in combination of two or more kinds thereof.

A content of the polyfunctional (meth)acrylate in the C layer is from 35% by mass to 95% by mass, preferably from 40% by mass to 90% by mass, and more preferably from 50% by mass to 90% by mass, with respect to the total amount of the polyfunctional (meth)acrylate and the at least one of inorganic fine particles or a hydrolysis condensate of a silicon compound.

When the content of the polyfunctional (meth)acrylate in the C layer is within the above range, the abrasion resistance, the heat bonding, and the adhesion after heat bending are excellent.

The content (% by mass) of the polyfunctional (meth) acrylate in the C layer can be determined by scraping a part of the C layer and performing the pyrolysis gas chromatography using the scraped C layer to specify the compound contained in the C layer as described above, and further specifying the composition of the C layer in combination with the result of characteristic absorption of infrared spectroscopic measurement performed in a wave number region of from 650 $cm^{-1}$ to 4,000 $cm^{-1}$ of the C layer.

Reaction Rate of Polyfunctional (Meth)acrylate

An addition polymerization reaction rate of a (meth) acryloyl group of the polyfunctional (meth)acrylate (hereinafter, may be simply referred to as the "reaction rate") is preferably from 30% to 70%, more preferably from 40% to 68%, and still more preferably from 45% to 65%, from the viewpoint of the abrasion resistance, the heat bendability, and the adhesion after heat bending.

A reaction rate of the (meth)acryloyl group of the polyfunctional (meth)acrylate in the C layer is determined as a value calculated by the following Equations (1) to (4) or Equation (5) from a peak (near 1,740 $cm^{-1}$) derived from (meth)acrylic ester and a peak (810 $cm^{-1}$) derived from a (meth)acrylic monomer by determining the composition of the inorganic fine particle dispersion and further performing an infrared spectroscopy (ART-IR) measurement on the surface of the C layer by an attenuation total reflection measurement method by the method of measuring the content ratio of each of the polyfunctional (meth)acrylate and the at least one of inorganic fine particles or a hydrolysis condensate of a silicon compound in the C layer.

(i) The ATR-IR measurement is performed on the surface of the C layer in a wave number region of from 650 $cm^{-1}$ to 2,000 $cm^{-1}$, and in each of the obtained measurement results, a background infrared absorbance $\alpha b$ represented by the following Equation (2) is calculated from a measured infrared absorbance $\alpha m$ represented by the following Equation (1) at 1,900 $cm^{-1}$ and 2,000 $cm^{-1}$.

$$\text{Measured infrared absorbance } \alpha m_{(wavelength)} = -\text{Log}(R_{(wavelength)}/100) \quad (1)$$

In the above equation, R represents a reflectance of attenuated total reflection at the measurement wavelength in the measurement sample.

$$\text{Background infrared absorbance } \alpha b_{(wavelength\ p)} = \alpha m_{(1,900)} \text{ at } 1,900\ cm^{-1} + (\text{wavelength } p - 1,900) \times (\alpha m_{(2,000)} \text{ at } 2,000\ cm^{-1} - \alpha m_{(1,900)} \text{ at } 1,900\ cm^{-1})/100 \quad (2)$$

(ii) A converted infrared absorbance $\alpha c_{(wavelength\ p)}$ is calculated by the following Equation (3) from the background infrared absorbance obtained above.

$$\alpha c_{(wavelength\ p)} = \alpha m_{(wavelength\ p)} - \alpha b_{(wavelength\ p)} \quad (3)$$

(iii) A reaction rate r of the (meth)acryloyl group of the polyfunctional (meth)acrylate is calculated by the following Equation (4) or (5) from the results of the ATR-IR measurement before and after the curing reaction of the C layer.

$$\text{Reaction rate r of (meth)acryloyl group of polyfunctional (meth)acrylate} = [1 - (\alpha c1_{(810)}/\alpha c1_{(1,740)})/(\alpha c0_{(810)}/\alpha c0_{(1,740)})] \times 100 \quad (4)$$

That is, it is calculated by the following equation.

$$r = [1 - (\alpha c1_{(810)} \times \alpha c0_{(1,740)})/(\alpha c0_{(810)} \times \alpha c1_{(1,740)})] \times 100 \quad (5)$$

In Equation (3) or (4), $\alpha c0_{(wavelength)}$ represents a converted infrared absorbance of the C layer before the curing reaction, and $\alpha c1_{(wavelength)}$ represents a converted infrared absorbance after the ATR-IR measurement.

The wavelength 810 refers to a peak derived from the (meth)acrylic monomer, and the wavelength 1,740 refers to a peak derived from the (meth)acrylic ester.

From the viewpoint of excellent abrasion resistance, heat bendability, and adhesion after heat bending, a blending ratio of the polyfunctional (meth)acrylate monomer is preferably from 40% by mass to 98% by mass, more preferably from 45% by mass to 96% by mass, and still more preferably from 60% by mass to 70% by mass, with respect to the total mass of a composite resin (C2) described below, the polyfunctional (meth)acrylate, and the inorganic fine particles.

Inorganic Fine Particles

The C layer contains at least one of inorganic fine particles or a hydrolysis condensate of a silicon compound. As the inorganic fine particles, inorganic oxide fine particles are preferable. Examples of the inorganic oxide fine particle include titanium oxide, zinc oxide, cerium oxide, and silicon dioxide (silica). Among them, a silica fine particle such as colloidal silica is preferable.

Examples of a commercially available colloidal silica include methanol silica sols IPA-ST, PGM-ST, MEK-ST, NBA-ST, XBA-ST, DMAC-ST, ST-UP, ST-OUP, ST-20, ST-40, ST-C, ST-N, ST-O, ST-50, and ST-OL (product name) manufactured by Nissan Chemical Industries, Ltd.

As the silica fine particle, a silica fine particle having improved dispersibility obtained by a known method may be used. Examples of the silica fine particle having improved dispersibility include a silica fine particle subjected to a surface treatment with a reactive silane coupling agent having a hydrophobic group and a silica fine particle modified with a compound having a (meth)acryloyl group. Examples of a commercially available colloidal silica having a (meth)acryloyl group include MIBK-SD, MIBK-AC, MEK-AC, and PGM-AC (product name) manufactured by Nissan Chemical Industries, Ltd.

The shape of the silica fine particle is not particularly limited, and a spherical, hollow, porous, rod-like, plate-like, fibrous, or amorphous silica fine particle can be used. For example, as a commercially available hollow silica fine particle, SILINAX manufactured by Nittetsu Mining Co., Ltd. can be used.

An average primary particle size of the inorganic oxide fine particles is preferably from 1 nm to 200 nm and more preferably from 1 nm to 100 nm. By setting the average primary particle size of the inorganic oxide fine particles within the above range, a curved member having excellent abrasion resistance, heat bendability, and adhesion after heat bending can be obtained.

The average primary particle size of the inorganic oxide fine particles is preferably from 3 nm to 500 nm, more preferably from 5 nm to 300 nm, and still more preferably from 10 nm to 100 nm, from the viewpoint of dispersibility in the hard coat layer.

From the viewpoint of the dispersibility in the hard coat layer, the inorganic oxide fine particle is preferably spherical colloidal silica having an average primary particle size of from 5 nm to 100 nm, and more preferably colloidal silica an average primary particle size of from 20 nm to 60 nm.

The average primary particle size of the inorganic oxide fine particles is measured by observing the hard coat layer in a cross section of the injection molding according to the disclosure with a transmission electron microscope (TEM).

Blending Ratio of Inorganic Fine Particles

The inorganic fine particles may be used singly, or in combination of two or more kinds thereof.

A blending ratio of the inorganic fine particles is preferably from 5% by mass to 30% by mass with respect to the total mass of a composite resin (C2) described below, the polyfunctional (meth)acrylate compound, and the inorganic fine particles, and is preferably from 5.5% by mass to 20% by mass and more preferably from 6% by mass to 16% by mass, from the viewpoint of the abrasion resistance, the heat bendability, and the adhesion after heat bending.

Hydrolysis Condensate of Silicon Compound

Preferred examples of the hydrolysis condensate of the silicon compound include a hydrolyzable silane compound. Examples of the hydrolyzable silane compound include a hydrolysis condensate of an alkoxysilane compound.

Specific examples of the hydrolyzable silane compound include hydrolysis condensates, for example, alkyl trialkoxysilane such as methylmethoxysilane, methyltriethoxysilane, ethyltrimethoxysilane, or ethyltriethoxysilane; 3-(meth)acryloyloxypropyltrialkoxysilane such as 3-(meth)acryloyloxypropyltrimethoxysilane or 3-(meth)acryloyloxypropyltriethoxysilane; vinyl trialkoxysilane such as vinyltrimethoxysilane, or vinyltriethoxysilane; and an alkoxysilane compound such as aminomethyltrimethoxysilane, aminomethyltriethoxysilane, 2-aminoethyltrimethoxysilane, 2-aminoethyltriethoxysilane, 3-aminopropyltrimethoxysilane, or 3-aminopropyltriethoxysilane.

The hydrolysis condensate of the alkoxysilane compound is obtained by subjecting an alkoxysilane compound to a hydrosis condensation reaction. In the hydrolysis condensation reaction, it is preferable that the condensation reaction proceeds together with hydrolysis, and most of Si—OR that is a hydrolyzable group of the hydrolyzable silane compound is hydrolyzed by 100%. It is preferable from the viewpoint of liquid stability that 80% or more, more preferably 85% or more, and particularly preferably 90% or more of most of the OH groups formed by hydrolysis are condensed with hydroxy groups formed by hydrolysis of another alkoxysilane compound.

The hydrolysis condensate of the silicon compound may be obtained by subjecting an alkoxysilane compound alone to a hydrolysis reaction, or may be obtained by subjecting an alkoxysilane compound to a hydrolysis reaction in the presence of the inorganic oxide fine particles described above. From the viewpoint of dispersibility in the inorganic oxide fine particles, it is preferable that the hydrolysis condensate of the silicon compound is obtained by performing a hydrolysis reaction in the presence of the inorganic oxide fine particles described above.

In order to improve the dispersibility of the inorganic fine particles, the hydrolysis condensate of the silicon compound may be obtained by reacting a (meth)acrylic resin having an alkoxysilyl group in a side chain or a (meth)acrylic resin having a highly polar hydroxyl group, an amine group, or a carbonyl group in a side chain, and inorganic oxide fine particles and/or a hydrolyzable silane compound.

Composite Resin (C2)

In order to improve affinity between the polyfunctional (meth)acrylate and the at least one of inorganic fine particles or a hydrolysis condensate of a silicon compound, the hydrolysis condensate of the silicon compound preferably contains a composite resin (C2) obtained by condensation polymerization of a trialkoxysilyl group-containing (meth)acrylic resin and the hydrolysis condensate of the silicon compound.

The composite resin (C2) may be a composite resin having a (meth)acryloyl group in which the polyfunctional (meth)acrylate described above or a compound having a (meth)acryloyl group is attached by a condensation reaction so that it can be copolymerized with the polyfunctional (meth)acrylate described above at the time of curing the C layer.

Triazine-Based Ultraviolet Absorber (C4)

It is preferable that the hard coat layer (C layer) according to the disclosure contains a triazine-based ultraviolet absorber (C4).

Examples of the triazine-based ultraviolet absorber (C4) include an ultraviolet absorber having a triazine skeleton in a molecular skeleton.

The triazine-based ultraviolet absorber (C4) has the structure described above. Therefore, the triazine-based ultraviolet absorber (C4) has excellent ultraviolet absorbing ability. Since the inorganic fine particle dispersion has excellent compatibility with the triazine-based ultraviolet absorber (C4), the hard coat layer according to the disclosure that containing the inorganic fine particle dispersion has excellent light resistance.

Specific examples of the triazine-based ultraviolet absorber (C4) include 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2-ethylhexyloxy)propyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxyphenyl)-1,3,5-triazine, and 2-(2-hydroxy-4-[1-octyloxycarbonylethoxy]phenyl)-4,6-bis(4-phenylphenyl)-1,3,5-triazine.

The triazine-based ultraviolet absorber (C4) may be synthesized or a commercially available product may be used. As the commercially available product, TINUVIN400 (BASF SE), TINUVIN405 (BASF SE), or TINUVIN479 (BASF SE) can be used.

The triazine-based ultraviolet absorber (C4) is preferably 2-[4-(octyl-2-methylethanoate)oxy-2-hydroxyphenyl]-4,6-[bis(2,4-dimethylphenyl)]-1,3,5-triazine or 2-[4-(2-hydroxy-3-dodecyloxy-propyl)oxy-2-hydroxyphenyl]-4,6-[bis(2,4-dimethylphenyl)-1,3,5-triazine.

The triazine-based ultraviolet absorbers (C4) may be used singly, or in combination of two or more kinds thereof.

A blending amount of the triazine-based ultraviolet absorber (C4) is preferably from 3% by mass to 5% by mass with respect to 100 parts by mass of the total of the polyfunctional (meth)acrylate and the at least one of inorganic fine particles or a hydrolysis condensate of a silicon compound, and is more preferably from 3.5% by mass to 4.5% by mass from the viewpoint of the abrasion resistance, the adhesion after heat bending, and the weather resistance.

Hindered Amine (Light Stabilizer (C5))

It is preferable that the hard coat layer (C layer) according to the disclosure contains a hindered amine light stabilizer (C5). Examples of the hindered amine light stabilizer (C5) include a compound in which two of three substituents of a nitrogen atom in an amine compound (including a compound that forms a cyclic structure with two substituents and a nitrogen atom) have a structure having a large steric hinderance.

The hindered amine light stabilizer (C5) has the structure described above, and thus can be inactivated by reacting with an active species (radical) generated in the coating layer.

Specific examples of the hindered amine light stabilizer (C5) include alkyl type hindered amines such as bis(1,2,2,6,6-pentamethylpiperidine-4-yl)=3,4-bis{[(1,2,2,6,6-pentamethylpiperidine-4-yl)oxy]carbonyl}hexanedioate, bis(1,2,2,6,6-pentamethyl-4-piperidyl)=decanedioate, and 1,2,2,6,6-pentamethyl-4-piperidyl=methacrylate; hydrogen type hindered amines such as bis(2,2,6,6-tetramethylpiperidine-4-yl)=3,4-bis{[(2,2,6,6-tetramethylpiperidine-4-yl)oxy]carbonyl}hexanedioate and 2,2,6,6-tetramethyl-4-piperidyl=methacrylate; and alkoxy type hindered amines such as bis[2,2,6,6-tetramethyl-1-(undecyloxy)piperidine-4-yl]=carbonate and 1-octyloxy-2,2,6,6-tetramethyl-4-piperidyl=octanedioate.

The hindered amine may be synthesized or a commercially available product may be used.

As the commercially available product, TINUVIN123 (BASF SE), LA-52 (ADEKA Corporation), LA-57 (ADEKA Corporation), LA-68 (ADEKA Corporation), LA-72 (ADEKA Corporation), LA-77 (ADEKA Corporation), LA-81 (ADEKA Corporation), LA-82 (ADEKA Corporation), or LA-87 (ADEKA Corporation) can be used.

The hindered amines may be used singly, or in combination of two or more kinds thereof.

A blending amount of the hindered amine is preferably from 0.5% by mass to 30% by mass with respect to 100 parts by mass of the total of the polyfunctional (meth)acrylate and the at least one of inorganic fine particles or a hydrolysis condensate of a silicon compound, and is more preferably from 3% by mass to 20% by mass from the viewpoint of the abrasion resistance, the adhesion after heat bending, and the weather resistance.

Other Components

The hard coat layer (C layer) according to the disclosure may contain components other than those described above (other components), if necessary. Examples of the other components include a surface conditioner, a colorant, and a dispersion medium for adjusting the amount of solids and viscosity of a dispersion liquid.

The dispersion medium may be a liquid medium that does not impair the effects of the disclosure, and examples of thereof include various organic solvents.

From the viewpoint that the thickness of the permeation layer (B layer) can be adjusted to a preferred range, examples of the organic solvent include alcohol such as methanol, ethanol, propanol, or butanol; ether such as dimethyl ether, diethyl ether, methyl ethyl ether, methyl butyl ether, tetrahydrofuran, or dioxane; ketone such as acetone, methyl ethyl ketone (2-butanone), methyl isobutyl ketone (4-methyl-2-pentanone), or cyclohexanone; ester such as methyl acetate, ethyl acetate, propyl acetate, butyl acetate, ethyl propionate, or ethyl pentanoate; ether alcohol such as methoxyethanol, ethoxyethanol, butoxyethanol, methoxypropanol (hereinafter, may also referred to as the "propylene glycol monomethyl ether (PGM)"), ethoxypropanol, or butoxypropanol; aliphatic hydrocarbon such as hexane, heptane, or octane; and aromatic hydrocarbon such as toluene, xylene, (ethylbenzene), styrene, or stilbene.

The organic solvents may be used singly, or in mixture thereof.

In a case in which the organic solvents are used singly, ether alcohol such as methoxyethanol, ethoxyethanol, butoxyethanol, methoxypropanol, ethoxypropanol, or butoxypropanol is preferably used, from the viewpoint of solubility of the acrylic resin contained in the hard coat layer (C) and permeability into the polycarbonate resin base material layer (A layer). Among them, methoxypropanol is particularly preferably used from the viewpoint of balance among volatility, solubility of the acrylic resin, and permeability into the polycarbonate resin base material layer (layer A), and low toxicity.

In a case in which a mixture of organic solvents is used, from the viewpoint of easily forming the permeation layer (B), it is preferable to use a mixed solvent containing at least one kind of organic solvent selected from the group consisting of ketone such as acetone, methyl ethyl ketone (2-butanone), methyl isobutyl ketone (4-methyl-2-pentanone), or cyclohexanone; ester such as methyl acetate, ethyl acetate, propyl acetate, butyl acetate, ethyl propionate, or ethyl pentanoate; and aromatic hydrocarbon such as toluene, xylene, (ethylbenzene), styrene, or stilbene, in addition to the ether alcohol exemplified as the organic solvent in the case of being used singly. A boiling point is in a range of from 70° C. to 140° C., and when the base material is heated and dried after application of hard coating, the solvent volatilizes and the permeation layer can be delayed from becoming thickener than necessary. Therefore, it is more preferably to use a mixed solvent obtained by adding at least one kind of organic solvent selected from the group consisting of methyl ethyl ketone, ethyl acetate, butyl acetate, and toluene to ether alcohol. It is particularly preferable to use a mixed solvent obtained by adding at least one kind of organic solvent selected from the group consisting of methyl ethyl ketone, ethyl acetate, butyl acetate, and toluene to methoxypropanol.

From the viewpoint of volatility during coating and solvent recovery, the organic solvent is preferably methyl ethyl ketone (MEK) or methoxypropanol (propylene glycol monomethyl ether).

A content of the organic solvent is preferably from 40 parts by mass to 70 parts by mass, and more preferably from 45 parts by mass to 65 parts by mass, with respect to 100 parts by mass of the inorganic fine particle dispersion.

It is more preferable that the inorganic fine particle dispersion used in the hard coat layer according to the disclosure further contains a photopolymerization initiator in a case in which the inorganic fine particle dispersion is cured by ultraviolet rays.

As the photopolymerization initiator, a known photopolymerization initiator may be used, and for example, one or more selected from the group consisting of acetophenone, benzyl ketal, and benzophenone can be preferably used. Examples of the acetophenone include diethoxyacetophenone, 2-hydroxy-2-methyl-1-phenylpropan-1-one, 1-(4-isopropylphenyl)-2-hydroxy-2-methylpropan-1-one, and 4-(2-hydroxy)ethoxy)phenyl-(2-hydroxy-2-propyl)ketone. Examples of the benzyl ketal include 1-hydroxycyclohexylphenyl ketone and benzyl dimethyl ketal.

Examples of the benzophenone include benzophenone and methyl o-benzoylbenzoate.

Examples of benzoin include benzoin, benzoin methyl ether, and benzoin isopropyl ether.

The photopolymerization initiators may be used singly, or in combination of two or more kinds thereof.

The amount of the photopolymerization initiator used is preferably from 1% by mass to 15% by mass, and more preferably from 2% by mass to 10% by mass, with respect to 100 parts by mass of the total of the polyfunctional (meth)acrylate and the at least one of inorganic fine particles or a hydrolysis condensate of a silicon compound.

Method of Producing Polycarbonate Resin Laminate with Hard Coat Layer for Heat Bending As a method of producing a polycarbonate resin laminate with a hard coat layer for heat bending, a known production method can be used. For example, a polycarbonate resin laminate with a hard coat layer for heat bending that has both long-term weather resistance and excellent abrasion resistance outdoors and has excellent adhesion to a base material can be obtained by applying a coating liquid of an inorganic fine particle dispersion to at least one surface of a polycarbonate resin layer and then irradiating the coating surface with active energy rays such as ultraviolet rays.

Examples of the active energy ray include ultraviolet rays emitted from light sources such as a xenon lamp, a low-pressure mercury lamp, a high-pressure mercury lamp, an ultra-high-pressure mercury lamp, a metal halide lamp, a carbon arc lamp, and a tungsten lamp, and electron rays, α rays, β rays, and γ rays extracted from a particle accelerator of usually from 20 kV to 2,000 kV.

As the active energy ray, in particular, an ultraviolet ray or an electron beam is preferably used, and an ultraviolet ray is preferably used.

By addition polymerization of the double bond in the polyfunctional (meth)acrylate by irradiation with an active energy such as an ultraviolet ray, free molecular motion of molecules contained in the hard coat layer (C layer) is suppressed, and the permeation layer (B layer) can be solidified.

As the ultraviolet ray source, a solar ray, a low-pressure mercury lamp, a high-pressure mercury lamp, an ultra-high-pressure mercury lamp, a carbon arc lamp, a metal halide lamp, a xenon lamp, an argon laser, or a helium-cadmium laser can be used. Using these ultraviolet ray sources, the coating film can be cured by irradiating the coating surface of the inorganic fine particle dispersion with an ultraviolet ray having a wavelength of about from 180 nm to 400 nm.

The irradiation dose of ultraviolet ray is appropriately selected depending on the type and amount of the photopolymerization initiator to be used.

The curing by the active energy ray is particularly effective in a case in which the base material is a material having poor heat resistance such as plastic. In a case in which heat is used in combination within a range not affecting the base material, a known heat source such as hot air or an infrared ray can be used.

Thereafter, by addition polymerization of the double bond in the polyfunctional (meth)acrylate by irradiation with an ultraviolet ray, free molecular motion of molecules contained in the coating layer is suppressed, and the permeation layer can be solidified.

The laminate according to the disclosure may be colorless or colored, and is preferably a transparent member.

In the laminate according to the disclosure, the total light transmittance measured according to JIS K7361-1 (1997) (corresponding to ISO: 13468-1 1996) is preferably 50% or more, more preferably 70% or more, and still more preferably 85% or more.

Pre-heating Step

The step of pre-heating the polycarbonate resin laminate with a hard coat layer for heat bending (hereinafter, also simply referred to as the "pre-heating step") is a step of pre-heating the polycarbonate resin laminate with a hard coat layer for heat bending at from a temperature higher than Tg by 5° C. to a temperature higher than Tg by 70° C., in which Tg(° C.) is a glass transition temperature of the prepared polycarbonate resin laminate with a hard coat layer for heat bending.

The pre-heating step is preferably a step of pre-heating and softening the polycarbonate resin laminate with a hard coat layer for heat bending at from a temperature higher than Tg by 5° C. to a temperature higher than Tg by 70° C., in which Tg(° C.) is a glass transition temperature of the prepared polycarbonate resin of the laminate.

In the pre-heating, the polycarbonate resin laminate prepared in the laminate preparation step may be directly heated. In a case in which the polycarbonate resin laminate is masked for surface protection, masking is preferably removed.

As the pre-heating method, various usually known heating methods can be used. Examples thereof include an air forced circulation heating furnace, an infrared heater, and microwave heating. Among them, an air forced circulation heating furnace is preferable because it is easy to uniformly heat the polycarbonate resin laminate as a whole and a burden on equipment costs is small even in a case in which a sheet is large. A plurality of heating methods may be sequentially or simultaneously used in combination.

A pre-heating temperature is from a temperature higher than Tg by 5° C. to a temperature higher than Tg by 70° C. with respect to Tg(° C.) of the polycarbonate resin.

In the air forced circulation heating furnace, it is preferable that the temperature of the heating furnace is adjusted to the above temperature range, the treatment is performed for a predetermined time, and the temperature of the polycarbonate resin laminate is set to a temperature suitable for heat molding.

The pre-heating heat temperature range is preferably from a temperature higher than Tg by 5° C. to a temperature higher than Tg by 50° C., more preferably from a temperature higher than Tg by 10° C. to a temperature higher than Tg by 35° C., and still more preferably from a temperature higher than Tg by 15° C. to a temperature higher than Tg by 25° C.

For example, in a case in which a bisphenol A type polycarbonate resin is used (containing an additive in amount of about 1% by mass), Tg is about 150° C., and thus, the pre-heating temperature is from 155° C. to 220° C., preferably from 155° C. to 200° C., more preferably from 160° C. to 185° C., and still more preferably from 165° C. to 175° C.

When the pre-heating temperature range is within the above range, it is suitable for achieving both the production efficiency and the surface state and dimensional accuracy of the heat molded article.

Specifically, in a case in which the thickness of the polycarbonate resin laminate according to the disclosure is 4.5 mm, the heat treatment time is preferably from about 540 seconds to 840 seconds in a case in which the atmosphere in the heating furnace is higher than Tg by 20° C., more preferably from about 290 seconds to 590 seconds in a case in which the atmosphere in the heating furnace is higher than Tg by 30° C., and still more preferably from about 120 seconds to 420 seconds in a case in which the atmosphere in the heating furnace is higher than Tg by 40° C.

More usually, a relationship between a difference $x(° C.)$ between an ambient temperature and Tg of a thermoplastic resin in the heating furnace, and a treatment time y (seconds) is preferably in a range of $y=[(0.4x^2-45x+1,430)\times(z/4.5)^2]\pm 150$, and more preferably in a range of $y=[(0.4x^2-45x+1,430)\times(z/4.5)^2]\pm 100$, in which z (mm) is a thickness of the polycarbonate resin laminate.

It is preferable that the polycarbonate resin laminate is more softened as a radius of curvature of the curved member is smaller, $x(° C.)$ is preferably in a range of $190-(r/100) \leq Tg+x \leq 220-(r/100)$, in which r (mm) is the radius of curvature.

The polycarbonate resin laminate at the time of the pre-heating may be horizontally placed or vertically suspended.

The glass transition temperature (Tg(° C.)) of the polycarbonate resin is measured by a method defined in JIS K7121 (2012) (corresponding to ISO: 3146 1985), and refers to a glass transition temperature that can be recognized in a chart such as DSC. In a case in which the polycarbonate resin exhibits two or more glass transition temperatures for the reason that the polycarbonate resin contains two or more kinds of resins, the glass transition temperature refers to the highest temperature among these glass transition temperatures.

Step of Curving Laminate by Applying Pressure to Laminate (Curving Step)

The curving step is a step of curving the laminate (preferably the softened laminate) obtained in the pre-heating step by applying pressure to the laminate.

The degree of curvature of the laminate can be expressed by a radius of curvature (mm), and is preferably from 500 mm to 30,000 mm, more preferably 1,000 mm to 25,000 mm, and still more preferably in a range of from 1,500 mm to 10,000 mm.

Examples of the method of curving the laminate include vacuum molding, pressure molding, and press molding, and any method can be applied. Among them, it is preferable that it is a curving method by press molding that can be applied to a relatively thick laminate without causing cracks or the like on the surface of the laminate when the laminate is curved.

Here, the press molding refers to a method of obtaining a predetermined shape by pressurization using a mold or a frame when deforming the pre-heated laminate.

In the press molding, a mechanical drive apparatus is usually used to move the mold and other required machinery. As the drive apparatus, a pneumatic or hydraulic piston, a pneumatic or hydraulic motor, an electric motor, and an ultrasonic motor can be used, and a hydraulic piston is preferable.

The mold used for the press molding may be only a male mold, and it is preferable to have a structure in which female and male molds are engaged in order to enhance dimensional accuracy after the heat molding. That is, it is preferable to perform press molding by sandwiching the laminate between the female and male molds.

As the curving method, it is preferable to apply pressure so that the pressure is buffered, and specifically, the examples thereof include the following (a) to (e):

(a) a method typified by grease molding, that is, a method in which a mold is covered with an elastic flexible sheet that can be impregnated with a liquid material such as a felt or flannel, the mold is impregnated with a liquid material such as grease, and pressure from the mold surface is buffered by the liquid material;

(b) a method typified by the method described in Japanese Patent Publication No. H06-77961, that is, a method in which a mold having a coating layer impregnated and cured using a curable liquid elastomer such as a curable liquid silicone rubber as the liquid material in (a) is used;

(c) a method in which a mold having a coating layer formed directly on a surface thereof;

(d) a method called ridge molding (ridge forming), that is, a method in which a skeleton frame is brought into contact with an end of a laminate using a mold including a skeleton frame instead of a solid mold at least in the mold surface so that there is no contact of the mold at the end of the laminate; and (e) a method of forming a curved surface by applying a higher press pressure than that applied to the central portion of a laminate to an end of the laminate.

The (a) method is preferable in terms of a high degree of freedom in shape, and a cleaning step after molding is required. In the (d) method, the degree of freedom in shape is likely to be limited. Therefore, among the methods described above, the (b), (c), and (e) methods are more preferable, and in particular, the (e) method, which is simpler, is more preferable.

Here, examples of the method of forming a curved surface by applying a press pressure higher than that applied to the central portion of a laminate to an end of the laminate include:

(e-1): a method of providing a hard coating layer at an end of a laminate and providing a soft coating layer at the central portion of the laminate;

(e-2): a method of providing a coating layer having an increased contact area at an end of a laminate and providing a coating layer having a reduced contact area at the central portion of the layered layer by roughening a surface, interspersing contact points, or the like; and (e-3): a method of setting a thickness of a coating layer located at an end of a laminate to be larger than a thickness of the coating layer located at the central portion of the laminate to reduce pressure applied to the central portion of the laminate.

Among them, as the heat curving method, the (e-3) method is preferable from the viewpoint of simplicity. Examples of the coating layer include an elastomer layer and an elastic layer, and the elastic layer is preferable because it can be most simply used. Examples of the elastic layer include a layer formed of a knitted fabric, a woven fabric, or a non-woven fabric of a natural fiber, a synthetic fiber, and an inorganic fiber, a layer obtained by flocking short fibers thereof, and a porous foamed resin layer. In particular, the elastic layer is preferably a layer formed of a flannel or felt.

More preferred examples of the (e-3) method include a method using a mold in which the elastic flexible sheet is bonded to at least one of the mold surfaces, and the thickness of the elastic flexible sheet at the unnecessary portion where a higher press pressure is applied is made larger than the thickness of the central portion of the laminate, as the strength of the press pressure.

A thickness difference of the sheet is preferably from 0.1 mm to 3 mm, more preferably from 0.2 mm to 2 mm, and still more preferably from 0.3 to 1 mm. In the heat bending method, the press pressure at the portion where a high press pressure is applied is preferably from 0.05 MPa to 2 MPa.

The mold used for the press molding may be any one of a wood mold, a gypsum mold, a resin mold, and a metal mold. As the wood mold, any one of a veneer, a plywood, and a hard board can be used, it is preferable that a surface is treated with various varnishes for mold surface protection.

Preferred examples of the mold used for the press molding include the mold described in WO 2011/049186.

As a method of positioning a laminate in a mold, the mold method described in WO 2011/049186 can be used.

In the method of producing a curved member according to the disclosure, the curving step preferably includes a step of curving the polycarbonate resin laminate with a hard coat layer for heat bending so that at least one side of the C layer of the polycarbonate resin laminate with a hard coat layer for heat bending has a convex face shape.

Examples of the method of curving the polycarbonate resin laminate into a convex face shape include the curving method described above.

The method of producing a curved member according to the disclosure may include, before the pre-heating step, a step of performing printing on a surface of the C layer of the polycarbonate resin laminate with a hard coat layer for heat bending (printing step).

In the printing step, a printing method is not particularly limited, and printing can be performed on a flat or curved sheet surface by a usually known method.

Examples of the printing method include offset printing, flexographic printing, gravure printing, screen printing, and inkjet printing. Among them, screen printing can be preferably applied.

A thickness of a printed layer is preferably in a range of from 3 μm to 40 μm and more preferably in a range of from 5 μm to 35 μm. In the above range, it is possible to achieve both the intended purpose of the light-shielding printing layer and the work efficiency or the printed appearance.

The printed layer may be a single layer or a multi-layer including two or more layers.

As ink for the printed layer, various kinds of ink can be used. For example, as a binder component of a printing ink used in printing, a resin-based binder component described in WO 2011/049186, an oil-based binder component, or the like can be used.

It is preferable that the method of producing a curved member according to the disclosure includes a step of combining the respective steps in the following order from the viewpoint of the abrasion resistance, the heat bendability, and the adhesion after heat bending.

(Order 1): Laminate preparation step/printing step/pre-heating step/curving step (Order 2): Laminate preparation step/pre-heating step/curving step/printing step The method of producing a curved member according to the disclosure may further include steps other than the above steps (other steps).

Examples of the other steps include a trimming step of removing an unnecessary portion of a sheet described in WO 2011/049186, a step of attaching another member to a curved member, and a step of fixing the obtained curved member to a final product.

Since the laminate obtained by the method of producing a curved member according to the disclosure has excellent abrasion resistance, heat bending, and adhesion after heat bending, the laminate can be appropriately used as a glazing member such as a panoramic roof of an automobile or a back door window, a front plate application such as a liquid crystal television or a plasma television, and a transparent game plate in a game tool such as a pachinko game machine. Among them, the laminate obtained by the method of producing a curved member according to the disclosure can be appropriately used as a vehicle glazing member.

EXAMPLES

Hereinafter, the disclosure will be described in detail with reference to Examples, but the disclosure is not limited thereto. In the Examples, "%" and "part(s)" refer to "% by mass" and "part(s) by mass", respectively, unless otherwise stated.

Method of Preparing Precursor Material Liquid (C2-1) for Hard Coat Layer

To 203 parts by mass of a water-dispersible colloidal silica dispersion liquid (manufactured by JGC Catalysts and Chemicals Ltd., CATALOID SN-30, average particle size of about 17 nm, solid concentration of 30% by mass), 30 parts by mass of acetic acid was added and stirred, and 322 parts by mass of methyltrimethoxysilane was added to the dispersion liquid under cooling in an ice water bath. After the mixed liquid was stirred at 30° C. for an hour and a half, the mixed liquid was stirred at 60° C. for 8 hours, the reaction liquid was cooled with ice water, and 5 parts by mass of sodium acetate as a curing catalyst was mixed thereto under ice water cooling, thereby obtaining 560 parts by mass of polysiloxane (C2-1).

Method of Preparing Precursor Material Liquid (C2-2) for Hard Coat Layer 177.5 parts by mass of deionized water and 39.5 parts by mass of acetic acid were added and stirred, and 447.5 parts by mass of methyltrimethoxysilane was added to the dispersion liquid under cooling in an ice water bath. After the mixed liquid was stirred at 30° C. for an hour and a half, the mixed liquid was stirred at 60° C. for 8 hours, the reaction liquid was cooled with ice water, and 6.6 parts by weight of sodium acetate as a curing catalyst was mixed thereto under ice water cooling, thereby obtaining 671.1 parts by mass of polysiloxane (C2-2).

Hydrolysis Condensate of Silicon Compound: Synthesis of Composite Resin C2-X 164 parts by mass of methoxypropanol was added to a reaction vessel, the temperature was increased to 80° C., a mixture containing 40 parts by mass of methyl methacrylate (MMA), 8 parts by mass of butyl methacrylate (BMA), 36 parts by mass of butyl acrylate (BA), 24 parts by mass of acrylic acid (AA), 24 parts by mass of 3-methacrylic oxypropyltrimethoxysilane (MPTS), and 6 parts by mass of tert-butylperoxy-2-ethylhexanoate (TBPEH) was added dropwise to the reaction vessel for 4 hours, and then, the mixture was further reacted at the same temperature for 2 hours.

Furthermore, 560 parts of the resultant polysiloxane (C2-1) were added and stirred at the same temperature for 1 hour, then, 50 parts of glycidyl acrylate and 0.07 parts of methoquinone were added and stirred for 1 hour, the resultant reaction product was distilled under reduced pressure of from 10 kPa to 300 kPa under the condition of from 40° C. to 60° C. for 2 hours to remove the produced methanol and water, and then, propylene glycol monomethyl ether (PGM) was added, thereby obtaining 790 parts by mass of a composite resin C2-X having a non-volatile content (solid content) of 50.0% by mass and containing a polysiloxane segment (C1-1) derived from polysiloxane (C2-1) and a vinyl-based polymer segment.

In the composite resin C2-X, a blending ratio of the polysiloxane segment derived from polysiloxane (C2-1) was 60% by mass, and a blending ratio of the vinyl-based polymer segment was 40% by mass.

Hydrolysis Condensate of Silicon Compound: Synthesis of Composite Resin C2-Y 164 parts by mass of methoxypropanol was added to a reaction vessel, the temperature was increased to 80° C., a mixture containing 40 parts by mass of methyl methacrylate (MMA), 8 parts by mass of butyl methacrylate (BMA), 36 parts by mass of butyl acrylate (BA), 24 parts by mass of acrylic acid (AA), 24 parts by mass of 3-methacrylic oxypropyltrimethoxysilane (MPTS), and 6 parts by mass of tert-butylperoxy-2-ethylhexanoate (TBPEH) was added dropwise to the reaction vessel for 4 hours, and then, the mixture was further reacted at the same temperature for 2 hours.

Furthermore, 671.1 parts of the resultant polysiloxane (C2-2) were added and stirred at the same temperature for 1 hour, then, 50 parts of glycidyl acrylate and 0.07 parts of methoquinone were added and stirred for 1 hour, the resultant reaction product was distilled under reduced pressure of from 10 kPa to 300 kPa under the condition of from 40° C. to 60° C. for 2 hours to remove the produced methanol and water, and then, PGM was added, thereby obtaining 790 parts by mass of a composite resin C2-Y having a non-volatile content (solid content) of 50.0% by mass and containing a polysiloxane segment (C2-2) derived from polysiloxane (C2-2) and a vinyl-based polymer segment.

In the composite resin C2-Y, a blending ratio of the polysiloxane segment derived from polysiloxane (C2-2) was 60% by mass, and a blending ratio of the vinyl-based polymer segment was 40% by mass.

Preparation of Hard Coating Agent for Heat Bending (HC-1)

A hard coating agent (HC-1) was prepared by adding 42 parts by mass of trimethylolpropane ethylene oxide modified-triacrylate (manufactured by Toagosei Co., Ltd., ARONIX M-350) as a polyfunctional (meth)acrylate (C1-2), 18 parts by mass of 1,9-DA (manufactured by KYOEISHA CHEMICAL Co., LTD., 1,9-nonanediol diacrylate) as a polyfunctional (meth)acrylate (C1-3), 40 parts by mass of a hydrolysis condensate of a silicon compound (C2-X), 50 parts by mass of organic solvent-dispersible surface-modified colloidal silica (manufactured by Nissan Chemical Industries, Ltd., MEK-AC-2140Z, solid concentration of 40%) as inorganic fine particles (C3), 4 parts by mass of TINUVIN 400 (manufactured by BASF SE) as a hydroxyphenyltriazine ultraviolet absorber (C4), 15 parts by mass of LA-52 (manufactured by ADEKA Corporation) and 1 part by mass of TINUVIN 123 (manufactured by BASF SE) as a hindered amine light stabilizer (C5), and 1 part by mass of phenyl 1-hydroxyethyl ketone (manufactured by BASF SE, IRGACURE 184) as a photopolymerization initiator (C6), 20 parts by mass of methyl ethyl ketone, 100 parts by mass of methoxypropanol, and 40 parts by mass of isopropanol. The composition of (HC-1) is shown in Table 1.

Preparation of Hard Coating Agents for Heat Bending (HC-2 to HC-9)

(HC-2) to (HC-9) were prepared in the same manner as in the preparation of (HC-1) except that the composition shown in Table 1 was used.

Preparation of Hard Coating Agent for Heat Bending (HC-10)

80 parts by weight of a water-dispersible colloidal silica dispersion liquid (manufactured by JGC Catalysts and Chemicals Ltd., CATALOID SN-30, particle size of about 17 nm, solid concentration of 30% by mass) was added to 127 parts by weight of methyltrimethoxysilane under cooling in an ice water bath. After the mixed liquid was stirred at 25° C. for an hour and a half, the mixed liquid was stirred at 60° C. for 4 hours, the reaction liquid was cooled with ice water, and 24 parts by weight of acetic acid and 2 parts by weight of sodium acetate as a curing catalyst were mixed thereto under ice water cooling, thereby preparing a hard coating agent (HC-10).

TABLE 1

| | HC-1 | HC-2 | HC-3 | HC-4 | HC-5 |
|---|---|---|---|---|---|
| Content (parts by mass) of polyfunctional (meth)acrylate with respect to total amount of polyfunctional (meth)acrylate and at least one of inorganic fine particles or hydrolysis condensate of silicon compound | 60.0 | 45.0 | 86.0 | 70.0 | 60.0 |

TABLE 1-continued

| Component ratio (parts by mass) of polyfunctional (meth)acrylate | (C1-1) | M-315 | — | — | — | — | 40.0 |
|---|---|---|---|---|---|---|---|
| | (C1-2) | M-350 | 70.0 | 50.0 | 50.0 | 70.0 | 50.0 |
| | (C1-3) | 1-9 DA | 30.0 | 50.0 | 50.0 | 30.0 | 10.0 |
| Total amount (parts by mass) of polyfunctional (meth)acrylate | | | 60.0 | 45.0 | 86.0 | 70.0 | 60.0 |
| Hydrolysis condensate of silicon compound (parts by mass) | Type | Composite resin (C2-X) | 20.0 | 30.0 | 10.0 | — | — |
| | | Composite resin (C2-Y) | — | — | — | — | 40.0 |
| | Ratio of polysiloxane segment in composite resin | (C2-1) | 60.0 | 60.0 | 60.0 | — | — |
| | | (C2-2) | — | — | — | — | 60.0 |
| Inorganic fine particles (parts by mass) | Colloidal silica (C3) | MEK-AC-2140Z | 20.0 | 25.0 | 4.0 | 30.0 | — |
| Content (parts by mass) of at least one of inorganic fine particles or hydrolysis condensate of silicon compound with respect to total amount of polyfunctional (meth)acrylate and at least one of inorganic fine particles or hydrolysis condensate of silicon compound | | | 40 | 55 | 14 | 30 | 40.0 |
| Other components (parts by mass) | Ultraviolet absorber (C4) | Triazine-based ultraviolet absorber | 4.0 | 4.0 | 4.0 | 4.0 | 4.0 |
| | Hindered amine light stabilizer (C5) | LA-52 | 15.0 | — | 3.0 | — | — |
| | | LA-87 | — | 15.0 | — | 3.0 | — |
| | | TINUVIN 123 | 1.0 | 1.0 | 1.0 | 1.0 | 1.0 |
| | Photopolymerization initiator (C6) | Irgacure184 | 3.0 | 3.0 | 3.0 | 3.0 | 3.0 |

| | | | HC-6 | HC-7 | HC-8 | HC-9 |
|---|---|---|---|---|---|---|
| Content (parts by mass) of polyfunctional (meth)acrylate with respect to total amount of polyfunctional (meth)acrylate and at least one of inorganic fine particles or hydrolysis condensate of silicon compound | | | 60.0 | 60.0 | 34.0 | 97.0 |
| Component ratio (parts by mass) of polyfunctional (meth)acrylate | (C1-1) | M-315 | — | — | — | — |
| | (C1-2) | M-350 | 90.0 | 50.0 | 70.0 | 70.0 |
| | (C1-3) | 1-9 DA | 10.0 | 50.0 | 30.0 | 30.0 |
| Total amount (parts by mass) of polyfunctional (meth)acrylate | | | 60.0 | 60.0 | 34.0 | 97.0 |
| Hydrolysis condensate of silicon compound (parts by mass) | Type | Composite resin (C2-X) | 20.0 | 20.0 | 15.0 | 2.0 |
| | | Composite resin (C2-Y) | — | — | — | — |
| | Ratio of polysiloxane segment in composite resin | (C2-1) | 60.0 | 60.0 | 60.0 | 60.0 |
| | | (C2-2) | — | — | — | — |
| Inorganic fine particles (parts by mass) | Colloidal silica (C3) | MEK-AC-2140Z | 20.0 | 20.0 | 51.0 | 1.0 |
| Content (parts by mass) of at least one of inorganic fine particles or hydrolysis condensate of silicon compound with respect to total amount of polyfunctional (meth)acrylate and at least one of inorganic fine particles or hydrolysis condensate of silicon compound | | | 40 | 40 | 66 | 3 |
| Other components (parts by mass) | Ultraviolet absorber (C4) | Triazine-based ultraviolet absorber | 4.0 | 4.0 | 4.0 | 4.0 |
| | Hindered amine light stabilizer (C5) | LA-52 | — | 15.0 | — | — |
| | | LA-87 | — | — | 15.0 | — |
| | | TINUVIN 123 | 15.0 | — | — | — |
| | Photopolymerization initiator (C6) | Irgacure184 | 3.0 | 3.0 | 3.0 | 3.0 |

In Table 1, the numbers in the column of other components represent the ratio (% by mass) with respect to 100 parts by mass of the total of the total amount of the polyfunctional (meth)acrylate, the hydrolysis condensate of the silicon compound, and the inorganic particles. In addition, "-" in the table means the corresponding component is not contained.

Production of Resin Material

Production of Resin Material A1

9.5 parts by mass of PC shown below, 0.08 parts by mass of VPG shown below, 0.02 parts by mass of SA shown below, 0.03 parts by mass of PEPQ shown below, 0.05 parts by mass of IRGN shown below, 0.32 parts by mass of UV1577 shown below, and $1 \times 10^{-4}$ parts by mass of BL shown below were uniformly mixed with a super mixer. 90 parts by mass of PC was uniformly mixed with 10.0001 parts by mass of the mixture with a V-type blender, thereby obtaining a preliminary mixture for supply to an extruder.

The resultant preliminary mixture was supplied to an extruder. The extruder used was a vented twin-screw (manufactured by Japan Steel Works, Ltd.: TEX77CHT (full mesh, rotation in the same direction, two-start screw)) having a screw diameter of 77 mm. The extruder had a kneading zone including a combination of a feeding kneading disc and a reverse feeding kneading disc in order in a portion of L/D of about from 8 to 11 when viewed from the root of the screw, and a kneading zone including a feeding kneading disc in a portion of L/D of about from 16 to 17. The extruder further had a reverse feeding full light zone having a length of L/D of 0.5 immediately behind the second-half kneading zone. One vent port was provided at one portion of L/D of about from 18.5 to 20. The extrusion conditions were a discharge amount of 320 kg/h, a screw rotation speed of 160 rpm (revolutions per minute), and a degree of vacuum of the vent of 3 kPa. The extrusion temperature was configured to be increased stepwise from the first supply port at 230° C. to the die portion 280° C.

The strand extruded from the die was cooled in a hot water bath, and the cooled strand was cut and pelletized by a pelletizer. The pellets immediately after being cut passed through a vibrating sieve for about 10 seconds to remove long pellets and cut debris that were insufficiently cut.

A glass transition temperature of the resin material A1 was 150° C.

Production of Resin Material A2

9.43 parts by mass of PC shown below, 0.1 parts by mass of VPG shown below, 0.02 parts by mass of SA shown below, 0.03 parts by mass of PEPQ, 0.05 parts by mass of IRGN shown below, 0.3 parts by mass of UV1577 shown below, 0.07 parts by mass of IRA shown below, and $1\times10^{-4}$ parts by mass of BL shown below were uniformly mixed with a super mixer. 90 parts by mass of PC was uniformly mixed with 10.0001 parts by mass of the mixture with a V-type blender, and a pellet-like resin material A2 was obtained in the same manner as in the production of the resin material A1, except that the preliminary mixture for supply to an extruder was obtained.

A glass transition temperature of the resin material A2 was 148° C.

The raw materials used are as follows.

PC: Polycarbonate resin powder having a viscosity average molecular weight of 25,000 produced from bisphenol A and phosgene by an interfacial polycondensation method (manufactured by Teijin Limited: PANLITE L-1250WQ (product name))

VPG: Full ester of pentaerythritol and an aliphatic carboxylic acid (containing stearic acid and palmitic acid as main components) (manufactured by Emery Oleochemicals Japan Ltd.: LOXIOL VPG861)

SA: Fatty acid partial ester (manufactured by Riken Vitamin Co., Ltd.: RIKEMAL S-100A)

PEPQ: Phosphonite-based heat stabilizer (manufactured by Clariant AG: HOSTANOX P-EPQ)

IRGN: Hindered phenol antioxidant (manufactured by BASF SE: IRGANOX 1076)

UV 1577: 2-(4,6-diphenyl-1,3,5-triazine-2-yl)-5-[(hexyl)oxy]phenol (manufactured by BASF: TINUVIN 1577)

BL: Bluing agent (manufactured by Bayer AG: MACROLEX VIOLET B)

IRA: Infrared shielding agent containing an organic dispersion resin and $Cs_{0.33}WO_3$ (average particle size of 5 nm) as an inorganic infrared absorber, in which a content of the inorganic infrared absorber was about 23% by mass (manufactured by Sumitomo Metal Mining Co., Ltd., YMDS-874)

Production of Raw Sheet Molded Article

Production of Sheet-α 51

The pellets of the resin material A1 or A2 were molded by injection press using a large molding machine capable of injection-press molding provided with a 4-axis parallel control mechanism of a platen (manufactured by Meiki Co., Ltd.: MDIP2100, maximum clamping force of 33,540 kN), thereby producing a sheet molded article (sheet-α 51) having a thickness of 4.5 mm and a length×width of 1,000 mm×600 mm as illustrated in FIG. 1.

As illustrated in FIG. 1, the molding was performed at one point of a hot runner gate 53 and a gate 52. A metal mold had the same level of surface properties on both front and back surfaces of the plate.

The sheet-α 51 has a length of 1,000 mm, a width of 600 mm, and a thickness of 4.5 mm at a portion excluding the gate 52.

The gate 52 has a width of 120 mm and a thickness of 4.5 mm at the outer edge of the sheet. A distance from the center of the hot runner gate 53 to the outer edge of the sheet is 100 mm.

The large molding machine was provided with a hopper dryer facility capable of sufficiently drying the resin raw material, and the dried pellets were supplied to the molding machine supply port by pneumatic transportation and used for molding.

The molding was performed at a cylindrical temperature of 300° C., a hot runner set temperature of 300° C., a mold temperature of 110° C. on both fixed side and movement side, a press stroke of 1.5 mm, a pressing retention time of 120 seconds, a press pressure of 17 MPa, and an overlap time of 0.12 seconds, and a mold parting surface on the movement side was not in contact with a mold parting surface on the fixed side at the final movement position. After completion of filling, a valve gate was immediately closed so that the molten resin did not flow back from the gate to the cylinder. In any of steps of mold compression and mold opening in the molding, a parallelism between the molds was maintained by about 0.000025 or less as tan θ indicating the inclination amount and the twist amount by the 4-axis parallel control mechanism.

Production of Sheet-β 61

Figure 2:
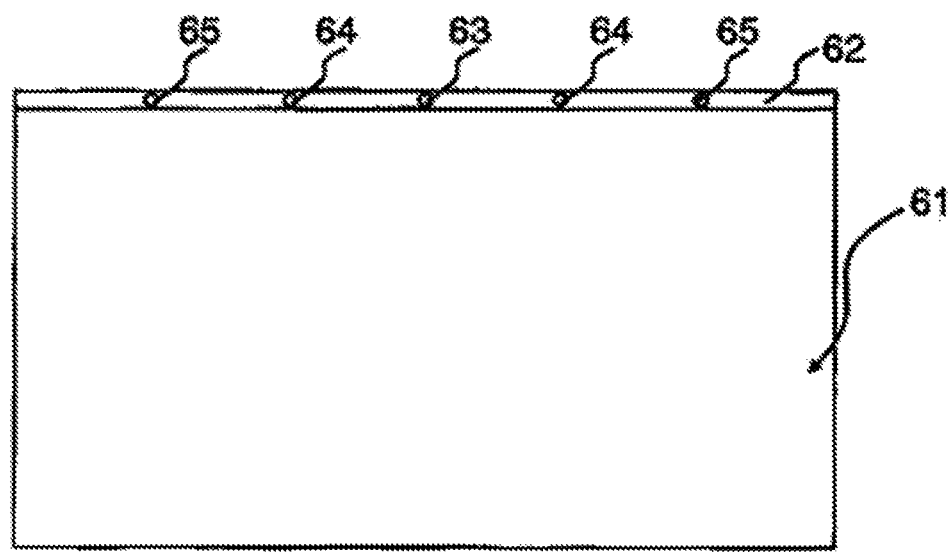
FIG. 2 is a view showing a shape of a sheet-β produced in an Example.

As illustrated in FIG. 2, the mold was changed to a mold having a gate 62 with five points of hot runners 63 to 65 on the long side, and molding was performed in the same manner as in the case of the sheet-α 51. As for the five points of the gates, cascade molding was performed in the order of the first hot runner gate 63, the second hot rubber gate 64, and the third hot rubber gate 65 by an SVG method, and a sheet without a welded portion was molded.

The sheet-β 61 has a length of 1,000 mm, a width of 600 mm, and a thickness of 4.5 mm at a portion excluding the gate 62.

The gate 62 has a thickness of 4.5 mm.

Production of Sheet-γ

After the resin material A1 or A2 was hot-air dried at 120° C. for 5 hours, an extruded sheet having a thickness of 4.5 mm and a width of 1,200 mm was produced according to the extrusion method of Japanese Patent Application Laid-Open No. 2005-081757, and both end portions of 100 mm were cut into long sides of 1,000 mm and cut at a length of 600 mm, thereby producing a sheet molded article having a thickness of 4.5 mm and a length×width of 1,000 mm×600 mm.

Production of Polycarbonate Resin Laminate with Hard Coat Layer

Examples 1 to 23 and Comparative Examples 1 to 8

The hard coating agents shown in Tables 2 to 4 were applied to the surfaces of the polycarbonate resin base material layers shown in Tables 2 to 4, and the hard coating agents were heated and dried under the conditions shown in Tables 2 to 4. Thereafter, a polycarbonate resin laminate with a hard coat layer was produced by performing irradiation with ultraviolet rays in the irradiation doses shown in Tables 2 to 4 under a mercury lamp having a lamp output of 1 kW.

The thicknesses of the polycarbonate resin layer (A layer), the permeation layer (B layer), and the hard coat layer (C layer) in the obtained carbonate resin laminate with a hard coat layer were measured by the method described above. The values are shown in Tables 2 to 4.

The values of the addition polymerization reaction rate (reaction rate) of the (meth)acryloyl group of the polyfunctional (meth)acrylate in the hard coat layer and the content (% by mass) of the polyfunctional (meth)acrylate in the C layer were determined as follows.

The C layer of each of the polycarbonate resin layered bodies with a hard coat layer of Examples 1 to 23 and Comparative Examples 1 to 8 was scraped, and pyrolysis gas chromatography was performed to identify the type of the compound contained in the C layer.

Furthermore, ATR-IR measurement of the C layer was performed using an infrared spectrometer (manufactured by Thermo Fisher Scientific, product name: NICOLETCON-TINUUM) and a zirconium terminal. The zirconium terminal was brought into contact with the surface of the C layer of the laminate, measurement was performed at 30 times of integration, and comparison of characteristic absorption in the infrared spectroscopic measurement was performed, thereby specifying the content (% by mass) of the polyfunctional (meth)acrylate in the C layer and the coating agent for forming a C layer. A non-contact state with the C layer was defined as a background.

The specified hard coating agents for heat bending were prepared using Examples 1 to 23 and Comparative Examples 1 to 8, the hard coating agents were applied to a glass substrate under yellow light and drying was performed, and then, ATR-IR measurement was performed, thereby determining a converted infrared absorbance $\alpha c0_{(wavelength)}$ of the hard coating agent before curing reaction at wave numbers of 1,740 cm$^{-1}$, 1,100 cm$^{-1}$, and 810 cm$^{-1}$.

A converted infrared absorbance $\alpha c0_{(wavelength)}$ was determined by the same method.

Next, the surface of the C layer of the obtained laminate was subjected to ATR-IR measurement, and a converted infrared absorbance $\alpha c1_{(wavelength)}$ of the hard coating agent after curing reaction was determined at 1,740 cm$^{-1}$, 1,100 cm$^{-1}$, and 810 cm$^{-1}$.

An addition polymerization reaction rate (reaction rate) of the (meth)acryloyl group of the polyfunctional (meth)acrylate in the hard coat layer determined by substituting the converted infrared absorbances $\alpha c0_{(wavelength)}$ and $\alpha c1_{(wavelength)}$ into each of Equation (4) or (5) was 63%.

The reaction rate and the content of the polyfunctional (meth)acrylate in the C layer determined as described above are shown as the values of Tables 2 to 4.

The obtained polycarbonate resin laminate with a hard coat layer was evaluated as follows. The results are shown in Tables 2 to 4.

As a result of measuring the obtained polycarbonate resin laminate with a hard coat layer by micro FT-IR, it was confirmed by the method described above that both components of the A layer and the C layer were contained in the B layer.

Method of Preparing Adhesive Layer Precursor Material Liquid (P-1) for (HC-10)

In a flask equipped with a reflux condenser and a stirrer and purged with nitrogen, 79.9 parts by mass of ethyl methacrylate (hereinafter, referred to as EMA), 33.6 parts by mass of cyclohexyl methacrylate (CHMA), 13.0 parts by mass of 2-hydroxyethyl methacrylate (HEMA), 126.6 parts by mass of methyl isobutyl ketone (MIBK), and 63.3 parts by mass of 2-butanol (2-BuOH) were added and mixed.

After the mixture was deoxygenated by passing nitrogen gas therethrough for 15 minutes, the mixture was heated to 70° C. under a nitrogen gas stream, 0.33 parts by mass of azobisisobutyronitrile (AIBN) was added, and the mixture was reacted in a nitrogen gas stream under stirring at 70° C. for 5 hours.

Further, 0.08 parts by mass of AIBN was added, and the mixture was heated to 80° C. and reacted for 3 hours, thereby a (meth)acrylic copolymer solution having a non-volatile component concentration of 39.6% by mass.

A weight average molecular weight of the (meth)acrylic copolymer was 125,000 in terms of polystyrene from the measurement of GPC (column: SHODEX GPCA-804, eluent: chloroform).

Subsequently, 43.2 parts by mass of MIBK, 21.6 parts by mass of 2-BuOH, and 83.5 parts by mass of 1-methoxy-2-propanol were added to and mixed with 100 parts by mass of the (meth)acrylic copolymer solution, 5.3 parts by mass of TINUVIN 400 (BASF SE, triazine-based ultraviolet absorber), 10.6 parts by mass of VESTANAT B1358/100 (manufactured by Degussa Japan Co., Ltd., polyisocyanate compound precursor) was added so that the isocyanate group was 1.0 equivalent to 1 equivalent of the hydroxy group of the (meth)acrylic copolymer in the (meth)acrylic resin solution, 0.015 parts by mass of dimethyldineodecanoate tin (DMDNT) was added, and the mixture was stirred at 25° C. for 1 hour, thereby preparing a precursor material liquid (P-1) of an adhesive layer for (HC-10) containing a (meth)acrylic copolymer resin as a main component.

Comparative Example 9

Production of Polycarbonate Resin Laminate with Hard Coat Layer

The polycarbonate resin plate shown in Table 4 was used as a substrate, and both surfaces thereof were dip-coated with the adhesive layer precursor material liquid (P-1) prepared above, heat curing was performed at 120° C. for 1 hour after air drying, and an adhesive layer having a thickness of 8 μm was formed on both surfaces of the polycarbonate substrate.

Subsequently, a hard coating agent for heat bending (HC-10) was dip-coated, heat curing was performed at 120° C. for 1 hour after air drying, and a base cured layer having a thickness of about 4 μm was formed on both surfaces to form a laminated layer, thereby producing a polycarbonate resin laminate with a hard coat layer. The thicknesses of the A layer, the B layer, and the C layer were measured by the method described above. The values are shown in Table 4.

Example 24

A design of a window frame was screen-printed in an atmosphere of 23° C. and a relative humidity of 50% under circulation with clean air by black ink having a light-shielding function on one surface of the polycarbonate resin laminate with a hard coat layer having both surfaces of the polycarbonate resin substrate on which the hard coat layer was formed by the same method as that of Example 1.

As the black ink, POS: two-component ink using a urethane resin of acrylic polyol and polyisocyanate as a binder (a uniform mixture of POS screen ink 911 black: 100 parts by weight, 210 curing agent: 5 parts by mass, and P-002 solvent: 15 parts by mass (all raw materials were manufactured by Teikoku Printing Inks Mfg. Co., Ltd.)) was used.

After the ink was applied by screen printing, air drying was performed in an atmosphere of 23° C. and a relative humidity of 50% for 30 minutes, and then, the ink layer was dried and fixed by a treatment at 90° C. for 60 minutes, thereby obtaining the printed polycarbonate resin laminate with a hard coat layer.

After the printed polycarbonate resin laminate with a hard coat layer was heated in an air forced circulation heating furnace at a furnace temperature of 170° C. for 10 minutes, the polycarbonate resin laminate was immediately fed to the heat press molding step by a continuous conveying apparatus, the polycarbonate resin laminate was sandwiched between a wood mold including female and male molds to be press-formed so that a surface having a printed layer became a concave surface, and the polycarbonate resin laminate was kept in the mold for 2 minutes, thereby obtaining a resin laminate having a curved surface.

The obtained resin laminate having a curved surface was cut (trimmed) using an NC end mill to obtain a glazing resin laminate having a curved surface on which a black ink layer was printed.

To a part of the outer peripheral end (on the printed layer) of the obtained glazing resin laminate having a black ink layer, an adhesive primer (manufactured by Yokohama Rubber Company, Limited, product name: primer for hematite body RC-50E) containing an acetic acid ester solvent as a main component was applied at a thickness of 8 μm, and a moisture-curable one-component urethane adhesive (manufactured by Yokohama Rubber Company, Limited, product name: HEMATITE WS222) was applied to form a triangle shape having a width of 12 mm and a height of 15 mm.

To a carbon fiber reinforced plastic (CFRP) vehicle body frame material prepared using a carbon fiber woven fabric prepreg impregnated with an epoxy resin assuming mounting on the vehicle body to which an adhesive primer (manufactured by Yokohama Rubber Company, Limited, product name: primer for hematite body RC-50E) containing an acetic acid ester solvent as a main component was applied at a thickness of 8 μm, the glazing resin laminate coated with the urethane adhesive was attached so that a thickness of the urethane adhesive was 6 mm, thereby obtaining an adhesive structure body. The thickness of the urethane adhesive was adjusted by installing a spacer having the same thickness on a vehicle body frame material formed of CFRP.

The obtained adhesive structure body was aged at 23° C. under the condition of 50% RH for 1 week, and then, the adhesive structure body was put in a hot air drying furnace at 70° C. and treated for 1,000 hours. The glazing resin laminate was fixed without any detachment of the adhesive.

Evaluation

The polycarbonate resin layered bodies with a hard coat layer of Examples 1 to 23 and Comparative Examples 1 to 9 were evaluated as follows. The results are shown in Tables 2 to 4.

Total Light Transmittance (TT)

The measurement was performed by NDH-300A manufactured by Nippon Denshoku Industries Co., Ltd. according to JIS K7361-1 (1997) (corresponding to ISO: 13468-1 1996).

Initial Haze (H)

The measurement was performed using a haze meter NDH2000 manufactured by Nippon Denshoku Industries Co., Ltd. The haze value (H) is represented by H=Td/Tt×100 (Td: scattered light transmittance, Tt: total light transmittance).

Abrasion Resistance (ΔH)

Before a Taber abrasion test, the surface of the polycarbonate resin laminate with a hard coat layer was polished 25 times with an ST-11 abrasive stone manufactured by Taber Industries to prepare a test piece. A Taber abrasion test was performed on the polished test piece using an abrasion wheel (product name: CS-10F, manufactured by Taber Industries) under conditions of a load of 500 g, 100 rotations, and 500 rotations in accordance with ASTM D1044, and a change in haze value (ΔH) of the surface of the polycarbonate resin laminate with a hard coat layer before and after the Taber abrasion test was measured.

The change in haze value (ΔH) was measured using a haze meter (product name: NDH2000, manufactured by Nippon Denshoku Industries Co., Ltd.) by the measurement method 2 and A light source. The haze value (H) indicates a value represented by H=Td/Tt×100 (Td: scattered light transmittance, Tt: total light transmittance).

The haze value (H) was measured for three test pieces having the same polishing specification, and the average value of ΔH was evaluated according to the following evaluation criteria. The smaller the value of ΔH, the better the abrasion resistance. It is preferable that ΔH is less than 9.0.

As the abrasion wheel used in the Taber abrasion test, an abrasion wheel having a change in haze value (ΔH) was in a range of from 0.6 to 1.0 in a case in which a commercially available float glass (plate glass) was subjected to a Taber abrasion test under a load of 500 g and 1,000 rotations by the same method as described above was used. An abrasion wheel in which ΔH was out of the above range was not used in the test.

Heat Bendability

A polycarbonate resin laminate with a hard coat layer of 100 mm×250 mm×5 mm was prepared, a thermocouple (T type, manufactured by MIT Inc.) was attached at a position distant from the end of the laminate by 5 cm, the laminate was put into a hot air circulation type heating furnace set at a heat bending pre-heating temperature as shown in Tables 2 to 4, and the laminate was heated.

When the laminate reached the heat bending pre-heating temperature, the laminate was immediately taken out of the heating furnace, immediately (within 5 seconds), bending was performed along a fan-shaped wood mold having a predetermined radius of curvature (70 mm, 100 mm, 150 mm, 175 mm, 200 mm, 250 mm, 300 mm, 400 mm, 500 mm, 700 mm, or 1,000 mm), the minimum radius of curvature at which cracks were not generated in the entire region having a radius of curvature of 100 mm×150 mm, which was the region in which the bending was performed, was determined, and the value thereof was used as a heat bendable radius of curvature (mm) of the laminate. The results are shown in Tables 2 to 4.

The smaller the value of the minimum radius of curvature, the better the heat bendability.

Adhesion After Heat Bending

Each test piece having the minimum radius of curvature determined in the heat bendability test was immersed in boiling water at 100° C., the test piece was held for 3 hours and then taken out from the boiling water, and the test piece was allowed to stand in an environment at room temperature (25° C.) for 2 hours after removing moisture adhering to the surface of the test piece, and then, the following adhesion test was performed on the test piece.

The surface of the hard coat layer of the test piece was scratched with a cutter knife so that a straight line having a length of 2 cm intersected with the test piece at 60°. A tape having a predetermined adhesive force (for example, a CELLOTAPE (product name) manufactured by NICHIBAN CO., LTD.) was attached and fixed to the scratch, and then a vertically strong peeling operation was repeated three times, and then, the presence or absence of the peeling of the hard coat layer on the test piece was visually observed. The adhesion after heat bending was evaluated according to the following evaluation criteria.

Evaluation Criteria
A: The peeling of the hard coat layer was not observed, and the adhesion after the heat bending was excellent.
B: The peeling of the hard coat layer was observed, and the adhesion after the heat bending was poor.

TABLE 2

|  |  | Examples | | | | | |
| --- | --- | --- | --- | --- | --- | --- | --- |
|  |  | 1 | 2 | 3 | 4 | 5 | 6 |
| Polycarbonate resin base material layer (A layer) | Resin material | A1 | A1 | A1 | A2 | A2 | A1 |
|  | Raw sheet | Sheet α | Sheet β | Sheet γ | Sheet α | Sheet γ | Sheet α |
|  | Thickness (mm) | 4.5 | 4.5 | 4.5 | 4.5 | 4.5 | 4.5 |
| Hard coat layer (C layer) | Hard coating agent | HC-1 | HC-1 | HC-1 | HC-1 | HC-1 | HC-1 |
| Heating and drying condition | Temperature (° C.) | 80 | 80 | 80 | 80 | 80 | 75 |
|  | Time (min) | 10 | 10 | 10 | 10 | 10 | 10 |
| Ultraviolet ray irradiation condition | Cumulative radiation dose (mJ/cm$^2$) | 1,000 | 1,000 | 1,000 | 1,000 | 1,000 | 1,000 |
| Layer thickness | Permeation layer (B layer) (μm) | 7 | 7 | 7 | 7 | 7 | 3 |
|  | Hard coat layer (C layer) (μm) | 13 | 13 | 13 | 13 | 13 | 8 |
|  | B layer + C layer (μm) | 20 | 20 | 20 | 20 | 20 | 11 |
|  | Proportion (%) of thickness of B layer | 35 | 35 | 35 | 35 | 35 | 27 |
| Reaction rate | (%) | 63 | 63 | 63 | 63 | 63 | 60 |
|  | Content (% by mass) of polyfunctional (meth)acrylate in C layer | 54 | 54 | 54 | 54 | 54 | 56 |
| Heat bending pre-heating | Temperature (° C.) | 190 | 190 | 190 | 190 | 190 | 190 |
|  | Time (sec) | 200 | 200 | 200 | 200 | 200 | 200 |
| Evaluation | Total light transmittance (TT) | 89.5 | 89.5 | 89.5 | 89.5 | 89.5 | 90.1 |
|  | Initial haze (H) | 0.3 | 0.3 | 0.3 | 0.3 | 0.3 | 0.2 |
|  | Abrasion resistance (ΔH) | 5.4 | 5.4 | 5.4 | 5.4 | 5.4 | 8.2 |
|  | Minimum radius of heat bending (mm) | 150 | 175 | 175 | 150 | 175 | 100 |
|  | Adhesion after heat bending | A | A | A | A | A | A |
|  |  | Examples | | | | | |
|  |  | 7 | 8 | 9 | 10 | 11 | 12 |
| Polycarbonate resin base material layer (A layer) | Resin material | A1 | A1 | A1 | A1 | A1 | A1 |
|  | Raw sheet | Sheet α | Sheet α | Sheet α | Sheet α | Sheet α | Sheet α |
|  | Thickness (mm) | 4.5 | 4.5 | 4.5 | 4.5 | 0.5 | 18 |
| Hard coat layer (C layer) | Hard coating agent | HC-1 | HC-1 | HC-1 | HC-1 | HC-1 | HC-1 |
| Heating and drying condition | Temperature (° C.) | 80 | 80 | 80 | 80 | 80 | 80 |
|  | Time (min) | 11 | 11 | 8 | 11 | 6 | 16 |
| Ultraviolet ray irradiation condition | Cumulative radiation dose (mJ/cm$^2$) | 1,000 | 1,000 | 1,000 | 1,000 | 1,000 | 1,000 |
| Layer thickness | Permeation layer (B layer) (μm) | 8 | 8 | 5 | 8 | 7 | 7 |
|  | Hard coat layer (C layer) (μm) | 12 | 22 | 17 | 8 | 13 | 13 |
|  | B layer + C layer (μm) | 20 | 30 | 22 | 16 | 20 | 20 |
|  | Proportion (%) of thickness of B layer | 40 | 27 | 23 | 50 | 35 | 35 |
| Reaction rate | (%) | 63 | 63 | 60 | 63 | 63 | 63 |
|  | Content (% by mass) of polyfunctional (meth)acrylate in C layer | 53 | 56 | 57 | 50 | 54 | 54 |
| Heat bending pre-heating | Temperature (° C.) | 190 | 190 | 190 | 190 | 190 | 190 |
|  | Time (sec) | 200 | 200 | 200 | 200 | 30 | 1,200 |
| Evaluation | Total light transmittance (TT) | 89.2 | 89.2 | 89.5 | 89.5 | 89.8 | 88.2 |
|  | Initial haze (H) | 0.5 | 0.3 | 0.2 | 0.7 | 0.3 | 0.5 |
|  | Abrasion resistance (ΔH) | 6.0 | 7.2 | 5.8 | 5.4 | 5.4 | 5.4 |
|  | Minimum radius of heat bending (mm) | 200 | 200 | 175 | 200 | 150 | 150 |
|  | Adhesion after heat bending | A | A | A | A | A | A |

TABLE 3

| | | Examples | | | | | |
|---|---|---|---|---|---|---|---|
| | | 13 | 14 | 15 | 16 | 17 | 18 |
| Polycarbonate resin base material layer (A layer) | Resin material | A1 | A1 | A1 | A1 | A1 | A |
| | Raw sheet | Sheet α | Sheet α | Sheet α | Sheet α | Sheet α | Sheet α |
| | Thickness (mm) | 4.5 | 4.5 | 4.5 | 4.5 | 4.5 | 4.5 |
| Hard coat layer (C layer) | Type | HC-2 | HC-2 | HC-3 | HC-3 | HC-3 | HC-4 |
| Heating and drying condition | Temperature (° C.) | 80 | 80 | 80 | 80 | 80 | 80 |
| | Time (min) | 11 | 11 | 9 | 12 | 11 | 10 |
| Ultraviolet ray irradiation condition | Cumulative radiation dose (mJ/cm$^2$) | 1,000 | 250 | 1,000 | 1,000 | 3,000 | 1,000 |
| Layer thickness | Permeation layer (B layer) (μm) | 7 | 7 | 7 | 8 | 7 | 7 |
| | Hard coat layer (C layer) (μm) | 13 | 13 | 13 | 4 | 13 | 13 |
| | B layer + C layer (μm) | 20 | 20 | 20 | 12 | 20 | 20 |
| | Proportion (%) of thickness of B layer | 35 | 35 | 35 | 67 | 35 | 35 |
| Reaction rate | (%) | 63 | 29 | 63 | 63 | 71 | 63 |
| | Content (% by mass) of polyfunctional (meth)acrylate in C layer | 39 | 39 | 83 | 75 | 83 | 65 |
| Heat bending pre-heating | Temperature (° C.) | 190 | 190 | 190 | 190 | 190 | 190 |
| | Time (sec) | 200 | 200 | 200 | 200 | 200 | 200 |
| Evaluation | Total light transmittance (TT) | 89.5 | 89.5 | 89.3 | 89.5 | 89.3 | 89.5 |
| | Initial haze (H) | 0.7 | 0.7 | 0.3 | 0.9 | 0.3 | 0.3 |
| | Abrasion resistance (ΔH) | 4.8 | 9.8 | 8.8 | 9.4 | 7.2 | 5.6 |
| | Minimum radius of heat bending (mm) | 200 | 150 | 100 | 200 | 200 | 200 |
| | Adhesion after heat bending | A | A | A | A | A | A |

| | | Examples | | | | |
|---|---|---|---|---|---|---|
| | | 19 | 20 | 21 | 22 | 23 |
| Polycarbonate resin base material layer (A layer) | Resin material | A1 | A1 | A1 | A1 | A1 |
| | Raw sheet | Sheet α | Sheet α | Sheet α | Sheet α | Sheet α |
| | Thickness (mm) | 4.5 | 4.5 | 4.5 | 4.5 | 4.5 |
| Hard coat layer (C layer) | Type | HC-5 | HC-6 | HC-7 | HC-1 | HC-1 |
| Heating and drying condition | Temperature (° C.) | 80 | 80 | 80 | 80 | 80 |
| | Time (min) | 10 | 10 | 10 | 10 | 10 |
| Ultraviolet ray irradiation condition | Cumulative radiation dose (mJ/cm$^2$) | 1,000 | 1,000 | 1,000 | 1,000 | 1,000 |
| Layer thickness | Permeation layer (B layer) (μm) | 7 | 7 | 7 | 7 | 7 |
| | Hard coat layer (C layer) (μm) | 13 | 13 | 13 | 13 | 13 |
| | B layer + C layer (μm) | 20 | 20 | 20 | 20 | 20 |
| | Proportion (%) of thickness of B layer | 35 | 35 | 35 | 35 | 35 |
| Reaction rate | (%) | 63 | 63 | 63 | 63 | 63 |
| | Content (% by mass) of polyfunctional (meth)acrylate in C layer | 54 | 54 | 54 | 54 | 54 |
| Heat bending pre-heating | Temperature (° C.) | 190 | 190 | 190 | 160 | 210 |
| | Time (sec) | 200 | 200 | 200 | 1,100 | 80 |
| Evaluation | Total light transmittance (TT) | 89.5 | 89.5 | 89.5 | 89.5 | 89.5 |
| | Initial haze (H) | 0.3 | 0.3 | 0.3 | 0.3 | 0.3 |
| | Abrasion resistance (ΔH) | 9.6 | 4.2 | 8.4 | 5.4 | 5.4 |
| | Minimum radius of heat bending (mm) | 175 | 200 | 150 | 200 | 200 |
| | Adhesion after heat bending | A | A | A | A | A |

TABLE 4

| | | Comparative Examples | | | | |
|---|---|---|---|---|---|---|
| | | 1 | 2 | 3 | 4 | 5 |
| Polycarbonate resin base material layer (A layer) | Resin material | A1 | A1 | A1 | A1 | A1 |
| | Raw sheet | Sheet α | Sheet α | Sheet α | Sheet α | Sheet α |
| | Thickness (mm) | 4.5 | 4.5 | 4.5 | 4.5 | 4.5 |
| Hard coat layer (C layer) | Type | HC-1 | HC-1 | HC-8 | HC-9 | HC-1 |
| Heating and drying condition | Temperature (° C.) | 75 | 80 | 80 | 80 | 80 |
| | Time (min) | 9 | 13 | 13 | 9 | 7 |

TABLE 4-continued

| | | | | | | |
|---|---|---|---|---|---|---|
| Ultraviolet ray irradiation condition | Cumulative radiation dose (mJ/cm$^2$) | 1,000 | 1,000 | 1,000 | 1,000 | 1,000 |
| Layer thickness | Permeation layer (B layer) (μm) | 1 | 10 | 7 | 7 | 4 |
| | Hard coat layer (C layer) (μm) | 6 | 15 | 13 | 13 | 18 |
| | B layer + C layer (μm) | 8 | 25 | 20 | 20 | 22 |
| | Proportion (%) of thickness of B layer | 12.5 | 40 | 35 | 35 | 18 |
| Reaction rate | (%) | 58 | 63 | 63 | 63 | 60 |
| | Content (% by mass) of polyfunctional (meth)acrylate in C layer | 58 | 53 | 29 | 96 | 57 |
| Heat bending pre-heating | Temperature (° C.) | 190 | 190 | 190 | 190 | 190 |
| | Time (sec) | 200 | 200 | 200 | 200 | 200 |
| Evaluation | Total light transmittance (TT) | 89.5 | 89.5 | 89.2 | 89.5 | 89.5 |
| | Initial haze (H) | 0.2 | 0.7 | 0.9 | 0.2 | 0.2 |
| | Abrasion resistance (ΔH) | 6.6 | 5.8 | 4.9 | 17.4 | 5.4 |
| | Minimum radius of heat bending (mm) | 150 | 250 | 300 | 100 | 200 |
| | Adhesion after heat bending | B | A | A | A | B |

| | | Comparative Examples | | | |
|---|---|---|---|---|---|
| | | 6 | 7 | 8 | 9 |
| Polycarbonate resin base material layer (A layer) | Resin material | A1 | A1 | A1 | A1 |
| | Raw sheet | Sheet α | Sheet α | Sheet α | Sheet α |
| | Thickness (mm) | 4.5 | 4.5 | 4.5 | 4.5 |
| Hard coat layer (C layer) | Type | HC-1 | HC-1 | HC-1 | HC-10 |
| Heating and drying condition | Temperature (° C.) | 80 | 80 | 80 | — |
| | Time (min) | 16 | 10 | 10 | — |
| Ultraviolet ray irradiation condition | Cumulative radiation dose (mJ/cm$^2$) | 1,000 | 1,000 | 1,000 | — |
| Layer thickness | Permeation layer (B layer) (μm) | 10 | 7 | 7 | 1 |
| | Hard coat layer (C layer) (μm) | 4 | 13 | 13 | 11 |
| | B layer + C layer (μm) | 14 | 20 | 20 | 12 |
| | Proportion (%) of thickness of B layer | 71 | 35 | 35 | 8.3 |
| Reaction rate | (%) | 60 | 63 | 63 | — |
| | Content (% by mass) of polyfunctional (meth)acrylate in C layer | 40 | 54 | 54 | — |
| Heat bending pre-heating | Temperature (° C.) | 190 | 152 | 225 | 190 |
| | Time (sec) | 200 | 1400 | 50 | 200 |
| Evaluation | Total light transmittance (TT) | 89.5 | 89.5 | 89.5 | 90.6 |
| | Initial haze (H) | 2.1 | 0.3 | 0.3 | 0.2 |
| | Abrasion resistance (ΔH) | 5.1 | 5.4 | 5.4 | 3.2 |
| | Minimum radius of heat bending (mm) | 300 | 500 | — | 500 |
| | Adhesion after heat bending | A | A | A | A |

In Comparative Example 8 in Table 4, the minimum radius of heat bending indicated by "-" means that heat bending could not be performed.

It can be seen that the polycarbonate resin laminate with a hard coat layer obtained by the method of producing a curved member of each of Examples 1 to 23 has excellent abrasion resistance, heat bendability, and adhesion after heat bending as compared to those of the polycarbonate resin laminate with a hard coat layer of each of Comparative Examples 1 to 9. In addition, the polycarbonate resin laminate with a hard coat layer of each of Examples 1 to 23 can keep the haze value low and has also excellent total light transmittance.

The disclosure of Japanese Patent Application No. 2019-186415 filed on Oct. 9, 2019 is incorporated herein by reference in their entirety. All publications, patent applications, and technical standards mentioned in this specification are incorporated herein by reference to the same extent as if each individual publication, patent application, or technical standard was specifically and individually indicated to be incorporated by reference.

The invention claimed is:

1. A method of producing a curved member, the method comprising:
   preparing a polycarbonate resin laminate with a hard coat layer for heat bending, by applying a hard coat layer (C layer) comprising an inorganic fine particle dispersion on at least one surface of a polycarbonate resin base material layer (A layer) having a thickness of from 0.1 mm to 20 mm, thereby forming a permeation layer (B layer) in which all components of the A layer and at least a portion of components of the inorganic fine particle dispersion of the C layer are mixed, on a contact surface, the polycarbonate resin laminate comprising the A layer, the B layer and the C layer sequentially and satisfying the following requirements (a), (b) and (c);
   pre-heating the polycarbonate resin laminate at from a temperature higher than Tg by 5° C. to a temperature higher than Tg by 70° C., wherein Tg (° C.) is a glass transition temperature of a polycarbonate resin of the prepared polycarbonate resin laminate; and
   curving the polycarbonate resin laminate obtained by the pre-heating by applying pressure to the polycarbonate resin laminate:
   (a) a thickness of the B layer is from 2 μm to 9 μm,
   (b) a proportion of the thickness of the B layer with respect to a total thickness of the B layer and the C layer is from 20% to 70%, and
   (c) the inorganic fine particle dispersion comprises a polyfunctional (meth)acrylate, and at least one of inorganic fine particles or a hydrolysis condensate of a silicon compound,
   wherein a content of the polyfunctional (meth)acrylate and a content of the at least one of inorganic fine particles or a hydrolysis condensate of a silicon compound are from 35% by mass to 95% by mass and from 5% by mass to 65% by mass, respectively, with respect to a total amount of the polyfunctional (meth)acrylate and the at least one of inorganic fine particles or a hydrolysis condensate of a silicon compound.

2. The method of producing a curved member according to claim 1, wherein the curving comprises curving the polycarbonate resin laminate such that at least one side of the C layer of the polycarbonate resin laminate has a convex face shape.

3. The method of producing a curved member according to claim 1, further comprising, before the pre-heating, performing a printing on a surface of the C layer of the polycarbonate resin laminate.

4. The method of producing a curved member according to claim 1, wherein a viscosity average molecular weight of the polycarbonate resin in the A layer is from 20,000 to 30,000.

5. The method of producing a curved member according to claim 1, wherein a total thickness of the B layer and the C layer is from 10 μm to 32 μm.

6. The method of producing a curved member according to claim 1, wherein an addition polymerization reaction rate of a (meth)acryloyl group of the polyfunctional (meth)acrylate is from 30% to 70%.

7. A polycarbonate resin laminate with a hard coat layer for heat bending, comprising a permeation layer (B layer) and a hard coat layer (C layer) containing an inorganic fine particle dispersion, sequentially layered on at least one surface of a polycarbonate resin base material layer (A layer) having a thickness of from 0.1 mm to 20 mm,
wherein:
the polycarbonate resin laminate satisfies the following requirements (a), (b), (c) and (d), and
the B layer contacts the A layer and the C layer:
(a) the B layer contains all components of the A layer and at least a portion of components of the inorganic fine particle dispersion of the C layer,
(b) a thickness of the B layer is from 2 μm to 9 μm,
(c) a proportion of the thickness of the B layer with respect to a total thickness of the B layer and the C layer is from 20% to 70%, and
(d) the inorganic fine particle dispersion comprises a polyfunctional (meth)acrylate, and at least one of inorganic fine particles or a hydrolysis condensate of a silicon compound,
wherein a content of the polyfunctional (meth)acrylate and a content of the at least one of inorganic fine particles or a hydrolysis condensate of a silicon compound are from 35% by mass to 95% by mass and from 5% by mass to 65% by mass, respectively, with respect to a total amount of the polyfunctional (meth)acrylate and the at least one of inorganic fine particles or a hydrolysis condensate of a silicon compound.

8. The polycarbonate resin laminate with a hard coat layer for heat bending according to claim 7, wherein a viscosity average molecular weight of a polycarbonate resin in the layer A is from 20,000 to 30,000.

9. The polycarbonate resin laminate with a hard coat layer for heat bending according to claim 7, wherein a total thickness of the B layer and the C layer is from 10 μm to 32 μm.

10. The polycarbonate resin laminate with a hard coat layer for heat bending according to claim 7, wherein an addition polymerization reaction rate of a (meth)acryloyl group of the polyfunctional (meth)acrylate is from 30% to 70%.

11. A method of producing a curved member, the method comprising:
preparing a polycarbonate resin laminate with a hard coat layer for heat bending which satisfies the following requirements (a), (b) and (c), by applying a first inorganic fine particle dispersion on at least one surface of a polycarbonate resin base material layer (A layer) having a thickness of from 0.1 mm to 20 mm, thereby forming a permeation layer (B layer) in which all components of the A layer and at least a portion of components of the first inorganic fine particle dispersion are mixed, on a contact surface, and then applying a hard coat layer (C layer) comprising a second inorganic fine particle dispersion, on the B layer;
pre-heating the polycarbonate resin laminate at from a temperature higher than Tg by 5° C. to a temperature higher than Tg by 70° C., wherein Tg (° C.) is a glass transition temperature of a polycarbonate resin of the prepared polycarbonate resin laminate; and
curving the polycarbonate resin laminate obtained by the pre-heating by applying pressure to the polycarbonate resin laminate:
(a) a thickness of the B layer is from 2 μm to 9 μm,
(b) a proportion of the thickness of the B layer with respect to a total thickness of the B layer and the C layer is from 20% to 70%, and
(c) the first and second inorganic fine particle dispersions comprise a polyfunctional (meth)acrylate, and at least one of inorganic fine particles or a hydrolysis condensate of a silicon compound,
wherein a content of the polyfunctional (meth)acrylate and a content of the at least one of inorganic fine particles or a hydrolysis condensate of a silicon compound are from 35% by mass to 95% by mass and from 5% by mass to 65% by mass, respectively, with respect to a total amount of the polyfunctional (meth)acrylate and the at least one of inorganic fine particles or a hydrolysis condensate of a silicon compound.

12. The method of producing a curved member according to claim 11, wherein the curving comprises curving the polycarbonate resin laminate such that at least one side of the C layer of the polycarbonate resin laminate has a convex face shape.

13. The method of producing a curved member according to claim 11, further comprising, before the pre-heating, performing a printing on a surface of the C layer of the polycarbonate resin laminate.

14. The method of producing a curved member according to claim 11, wherein a viscosity average molecular weight of the polycarbonate resin in the A layer is from 20,000 to 30,000.

15. The method of producing a curved member according to claim 11, wherein a total thickness of the B layer and the C layer is from 10 μm to 32 μm.

16. The method of producing a curved member according to claim 11, wherein an addition polymerization reaction rate of a (meth)acryloyl group of the polyfunctional (meth)acrylate is from 30% to 70%.

* * * * *